United States Patent
Stahl et al.

(10) Patent No.: US 10,142,675 B2
(45) Date of Patent: Nov. 27, 2018

(54) METHOD AND APPARATUS FOR MINIMIZING TIMING ARTIFACTS IN REMULTIPLEXING

(71) Applicant: THOMSON LICENSING, Issy de Moulineaux (FR)

(72) Inventors: Thomas A. Stahl, Indianapolis, IN (US); Suresh V. Leley, Indianapolis, IN (US)

(73) Assignee: InterDigital CE Patent Holdings (FR)

( * ) Notice: Subject to any disclaimer, the term of this patent is extended or adjusted under 35 U.S.C. 154(b) by 31 days.

(21) Appl. No.: 14/967,533

(22) Filed: Dec. 14, 2015

(65) Prior Publication Data

US 2016/0182943 A1    Jun. 23, 2016

Related U.S. Application Data

(60) Provisional application No. 62/092,998, filed on Dec. 17, 2014.

(51) Int. Cl.
*H04L 12/819* (2013.01)
*H04L 12/835* (2013.01)
(Continued)

(52) U.S. Cl.
CPC ....... *H04N 21/4344* (2013.01); *H04L 65/607* (2013.01); *H04N 21/2365* (2013.01);
(Continued)

(58) Field of Classification Search
CPC ... H04L 29/06027; H04L 47/21; H04L 47/30; H04L 47/50; H04L 65/607;
(Continued)

(56) References Cited

U.S. PATENT DOCUMENTS 5,790,543 A    8/1998  Cloutier
5,828,414 A    10/1998 Perkins et al.
(Continued)

FOREIGN PATENT DOCUMENTS

WO    WO9608115    3/1996
WO    9955092      10/1999

OTHER PUBLICATIONS

Bai et al, A Rate Control Algorithm for VBR Video Encoding and Transmission, IEEE Interantional Conference on Acoustics, Speech, and Signal Processing, Jan. 1, 2000.
(Continued)

*Primary Examiner* — Asad M Nawaz
*Assistant Examiner* — Kai Chang
(74) *Attorney, Agent, or Firm* — Jack Schwartz & Associates, PLLC

(57) ABSTRACT

A particular implementation for controlling single program transport streams during remultiplexing to a multiple program transport stream uses a series of leaky bucket buffers to minimize timing artifacts in the multi-program transport stream. Another implementation for controlling the remultiplexing process limits the number of consecutive packets to be transferred from each single program transport stream, or controls the multiplex frequency of each single program transport stream within the multi-program transport stream. An alternative implementation controls the remultiplexing process using multiple program clock reference values such that packets from each single program transport stream are released only after a previous program clock reference value is greater than the system time.

6 Claims, 34 Drawing Sheets

(51) Int. Cl.
*H04L 12/863* (2013.01)
*H04L 29/06* (2006.01)
*H04N 21/236* (2011.01)
*H04N 21/2365* (2011.01)
*H04N 21/434* (2011.01)
*H04N 21/44* (2011.01)
*H04N 5/073* (2006.01)

(52) U.S. Cl.
CPC . H04N 21/23608 (2013.01); H04N 21/23655 (2013.01); H04N 21/44004 (2013.01); *H04L 29/06027* (2013.01); *H04L 47/21* (2013.01); *H04L 47/30* (2013.01); *H04L 47/50* (2013.01); *H04N 5/0736* (2013.01); *H04N 21/23611* (2013.01); *H04N 21/44016* (2013.01)

(58) Field of Classification Search
CPC ........... H04N 5/0736; H04N 21/23608; H04N 21/23611; H04N 21/2365; H04N 21/23655; H04N 21/4344; H04N 21/4404; H04N 21/44016
See application file for complete search history.

(56) References Cited

U.S. PATENT DOCUMENTS

| | | | | |
|---|---|---|---|---|
| 6,330,286 | B1* | 12/2001 | Lyons | H04N 21/23406 375/240.26 |
| 6,721,271 | B1* | 4/2004 | Beshai | H04L 49/106 370/232 |
| 6,801,536 | B1* | 10/2004 | Foster | H04L 29/06027 348/E5.007 |
| 7,092,395 | B2 | 8/2006 | He et al. | |
| 7,623,521 | B1 | 11/2009 | Wingfield | |
| 7,665,116 | B2 | 2/2010 | Hartung et al. | |
| 7,804,761 | B2 | 9/2010 | Rosenhouse et al. | |
| 7,831,729 | B1* | 11/2010 | Eshet | H04N 21/23424 370/465 |
| 7,848,365 | B2 | 12/2010 | Jung et al. | |
| 8,468,572 | B2 | 6/2013 | Liu et al. | |
| 8,514,853 | B2* | 8/2013 | Beheydt | H04L 43/106 370/389 |
| 2001/0009548 | A1* | 7/2001 | Morris | H04N 9/8042 370/392 |
| 2002/0129155 | A1* | 9/2002 | Kovacevic | G11B 20/10 709/231 |
| 2002/0164152 | A1* | 11/2002 | Kato | G11B 27/034 386/248 |
| 2004/0170390 | A1* | 9/2004 | Kim | G11B 27/034 386/241 |
| 2004/0190515 | A1* | 9/2004 | Nogima | H04N 21/2181 370/392 |
| 2005/0039064 | A1* | 2/2005 | Balakrishnan | H04N 21/23608 713/400 |
| 2005/0169181 | A1* | 8/2005 | Kim | H04N 21/23608 370/235 |
| 2006/0036759 | A1* | 2/2006 | Shen | H04L 29/06027 709/234 |
| 2006/0088063 | A1 | 4/2006 | Hartung et al. | |
| 2007/0189315 | A1* | 8/2007 | Aoyanagi | H04N 21/23406 370/412 |
| 2008/0060015 | A1* | 3/2008 | Iwabuchi | G06F 3/14 725/54 |
| 2008/0068997 | A1* | 3/2008 | Krause | H04N 21/23406 370/232 |
| 2008/0310453 | A1* | 12/2008 | Bargauan | H04H 20/18 370/476 |
| 2010/0150182 | A1* | 6/2010 | Noronha, Jr. | H04J 3/1682 370/537 |
| 2010/0158101 | A1* | 6/2010 | Wu | H04N 21/23424 375/240.01 |
| 2010/0033149 | A1 | 12/2010 | Sharma et al. | |
| 2010/0333149 | A1* | 12/2010 | Sharma | H04N 7/17318 725/91 |
| 2011/0170539 | A1* | 7/2011 | Beheydt | H04L 43/106 370/389 |
| 2012/0177066 | A1* | 7/2012 | Spransy | H04N 21/23406 370/486 |
| 2014/0259086 | A1* | 9/2014 | Wajs | H04N 21/23439 725/116 |
| 2014/0301482 | A1* | 10/2014 | Narasimhan | H04N 19/70 375/240.26 |

OTHER PUBLICATIONS

Mondani etal, "Measurement based optimal source shaping with a shaping + multiplexing delay constraint", Proceedings IEEE INFOCOM 2000. Conference on Computer Communications. Nineteenth Annual Joint Conference of the IEEE Computer and Communications Societies (Cat. No. 00CH37064) Jan. 1, 2000.

Shuaib_etal, A De-Jittering Scheme for the Transport of MPEG-4 and MPEG-2 Video over ATM, Advanced Telecommunication Information Distriburtion Research Program Consortium, Oct. 31, 1999.

European Search Report dated Mar. 30, 2016.

Cable Television Laboratories ED, "Data-Over-Cable-Service-Interface Specifications Modular Headend Architecture" Edge QA Stream Interface Specifcation CM-SP-EQAM-VSI-I01-081107, pp. 1-39.

* cited by examiner

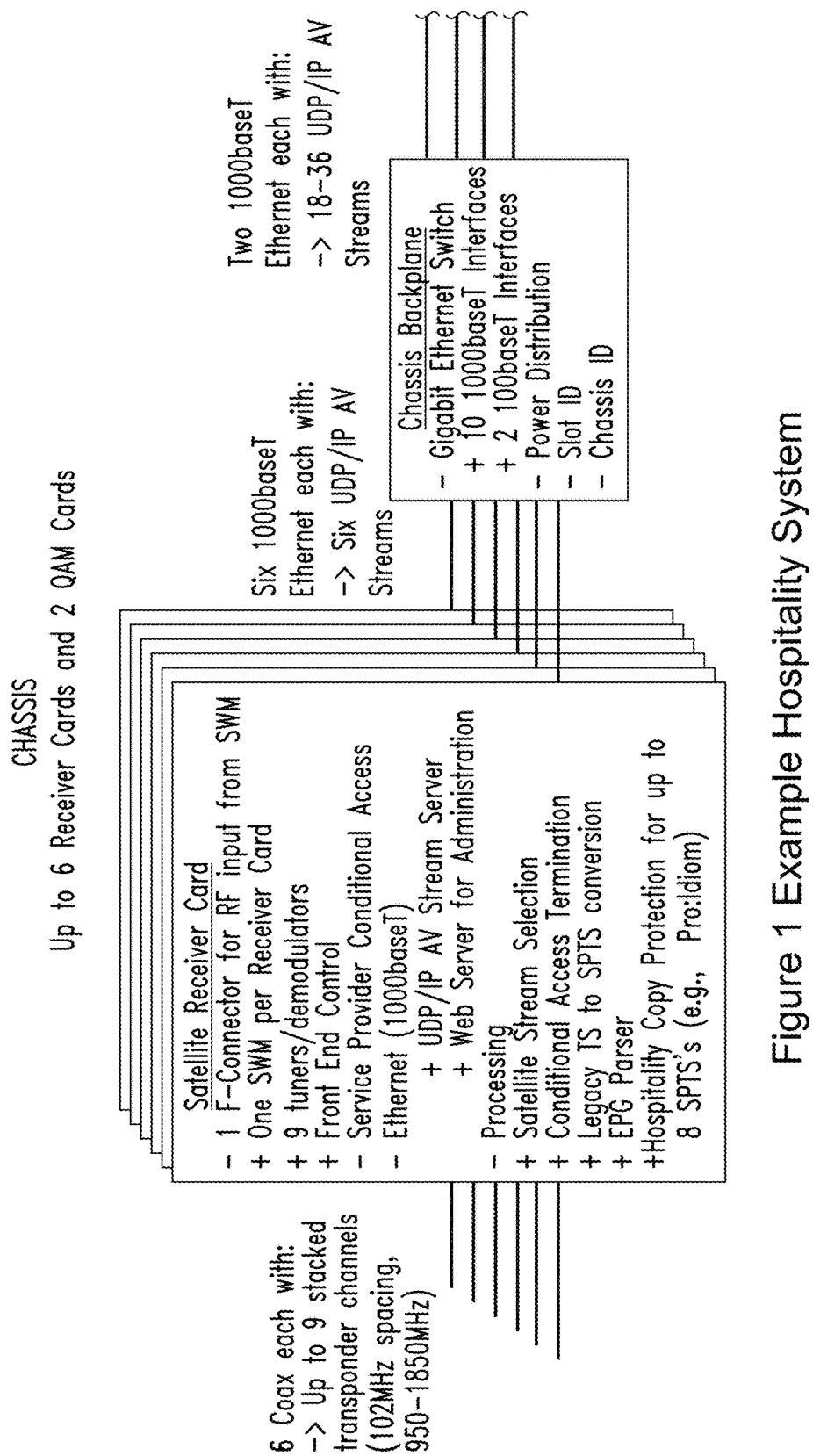
Figure 1 Example Hospitality System

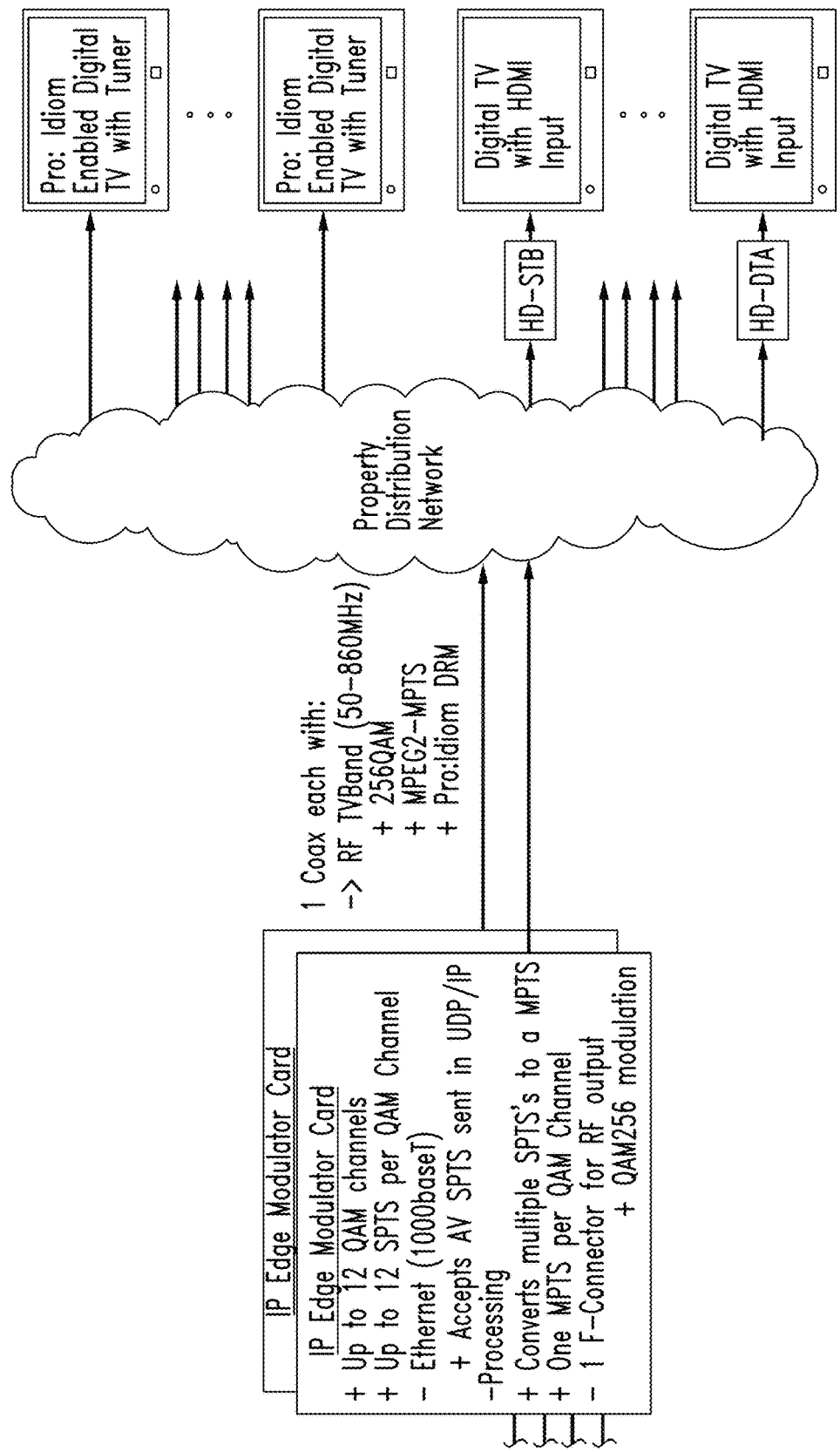
Figure 1(Continued) Example Hospitality System

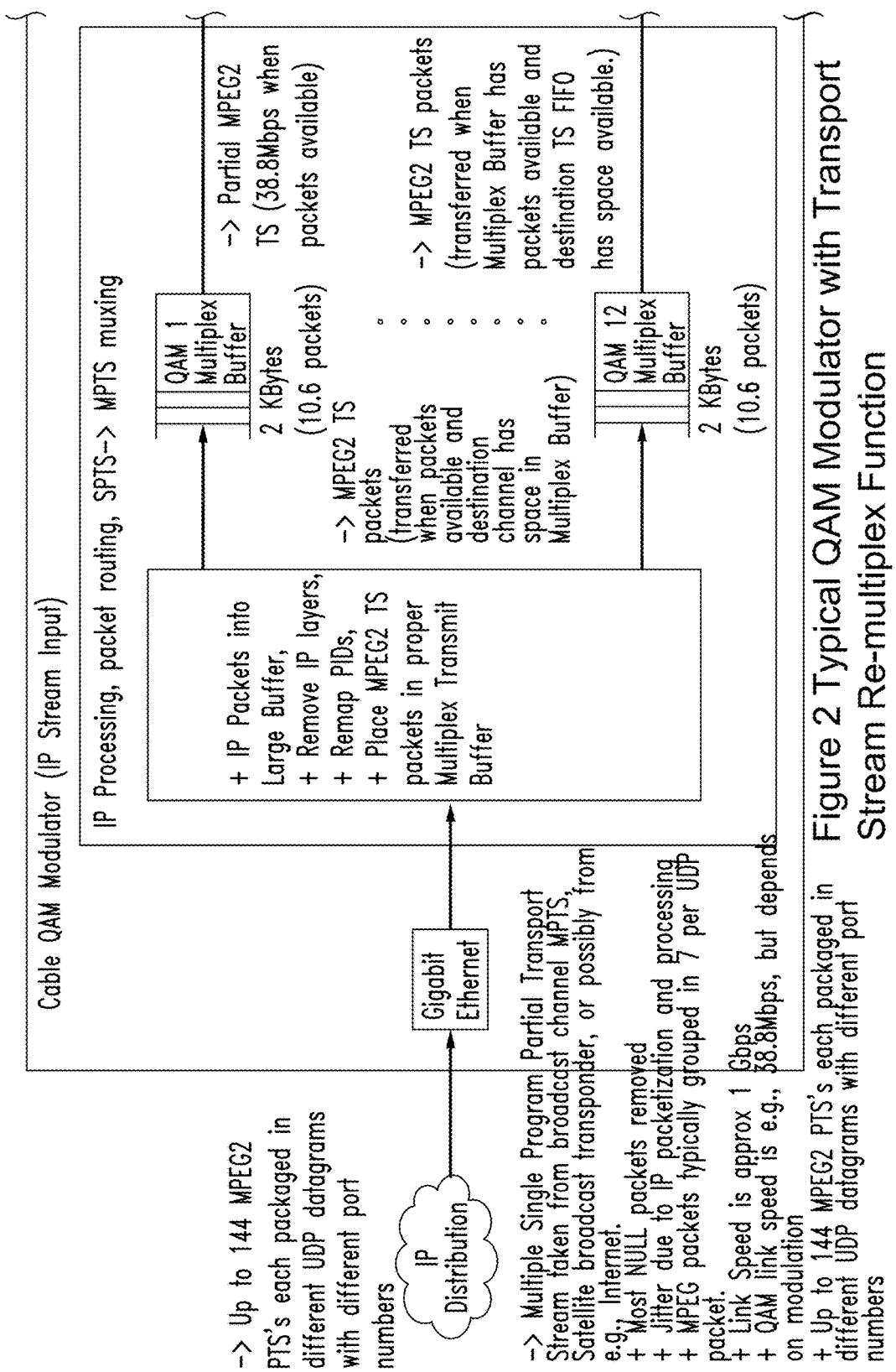
Figure 2 Typical QAM Modulator with Transport Stream Re-multiplex Function

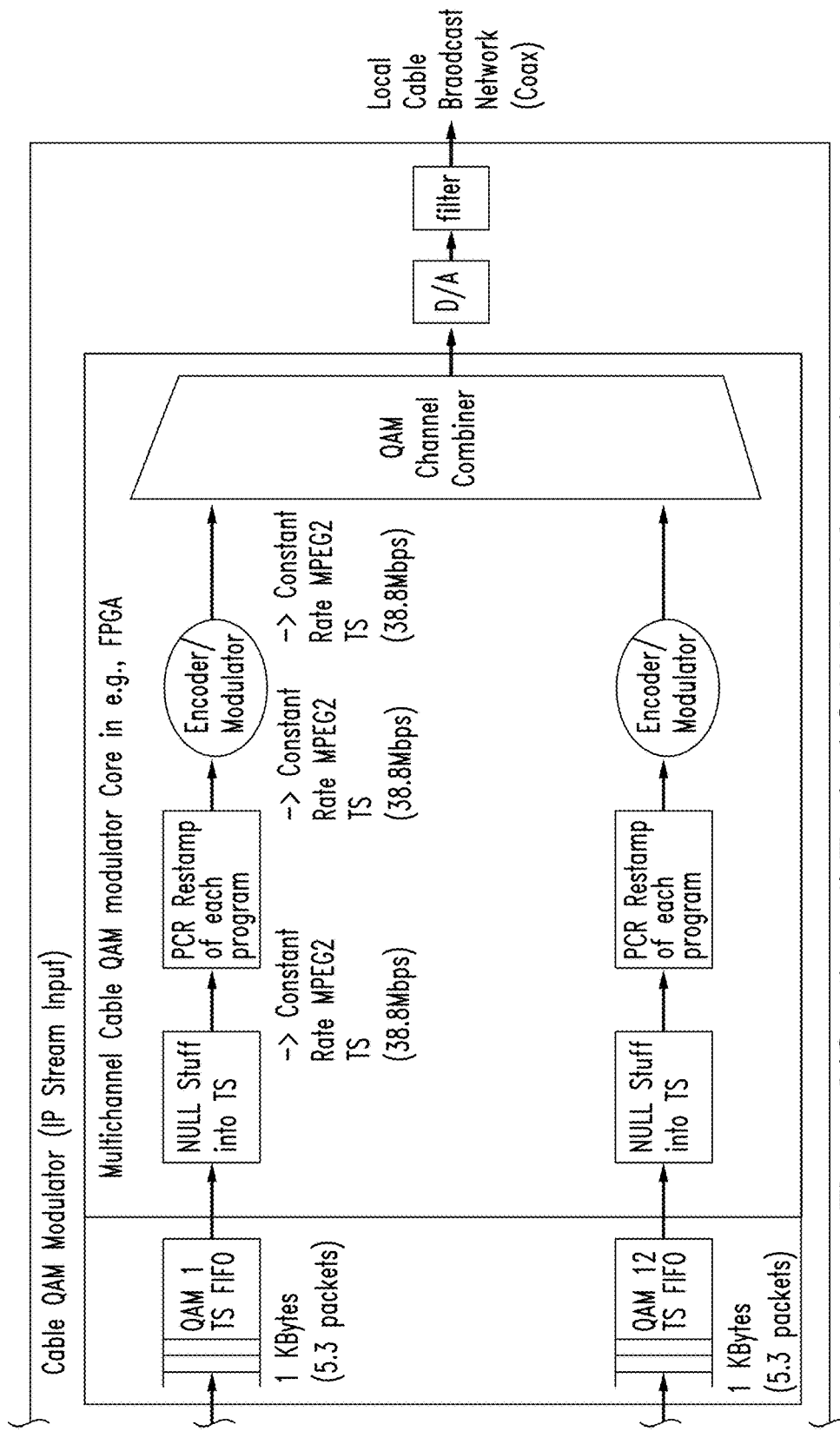
Figure 2(Continued) Typical QAM Modulator with Transport Stream Re-multiplex Function

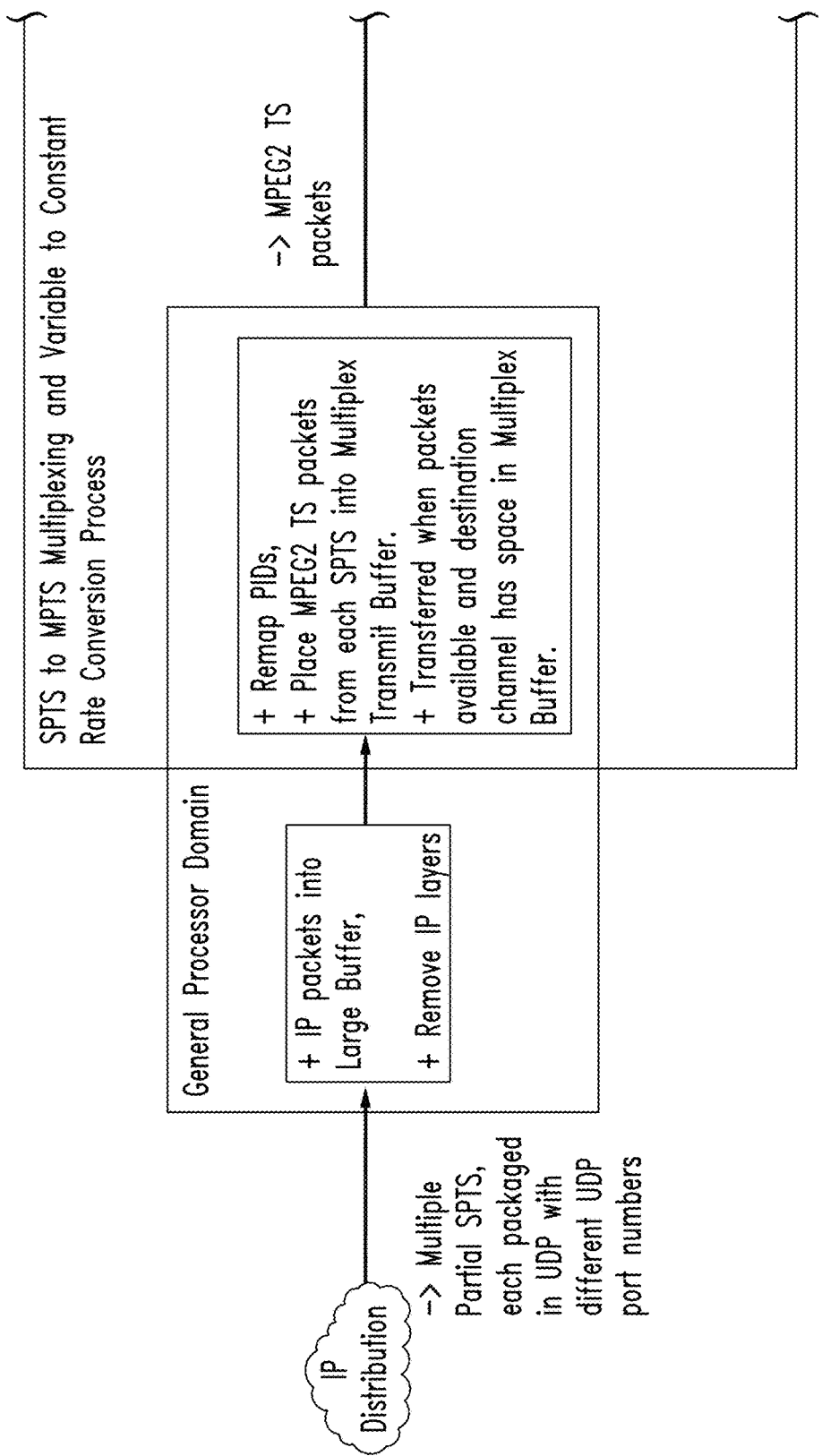
Figure 3 Single Channel of Typical QAM Modulator with Transport Stream Re-multiplex Function

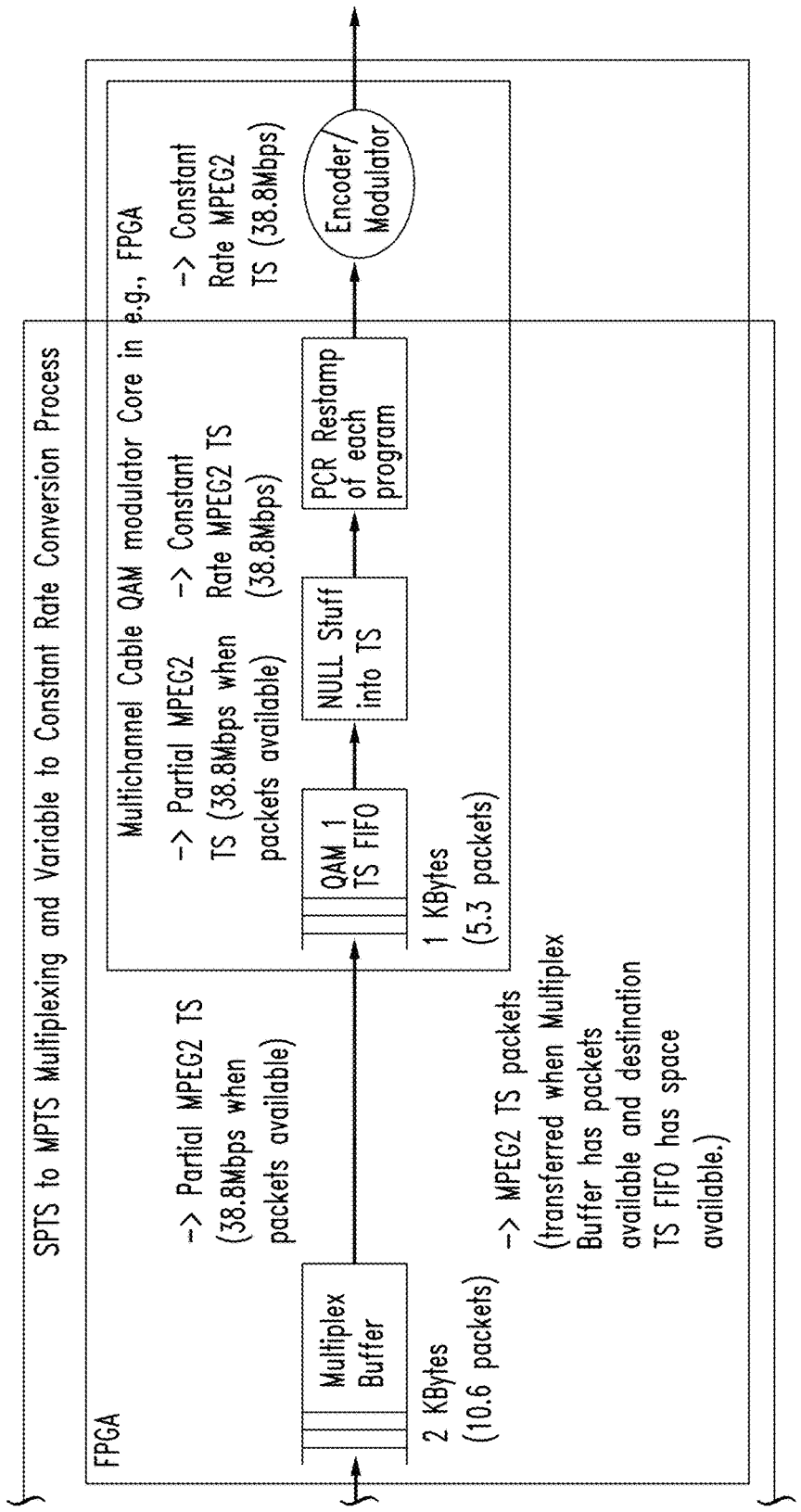
Figure 3(Continued) Single Channel of Typical QAM Modulator with Transport Stream Re-multiplex Function

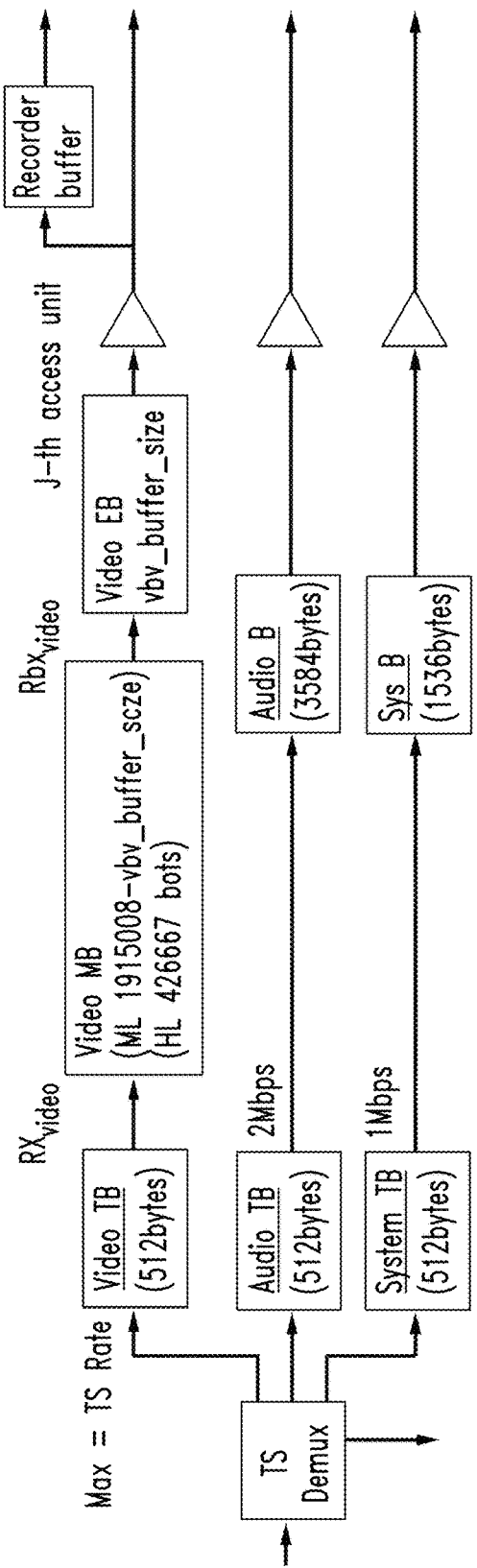
Figure 4 MPEG2 Transport Stream Target System Decoder

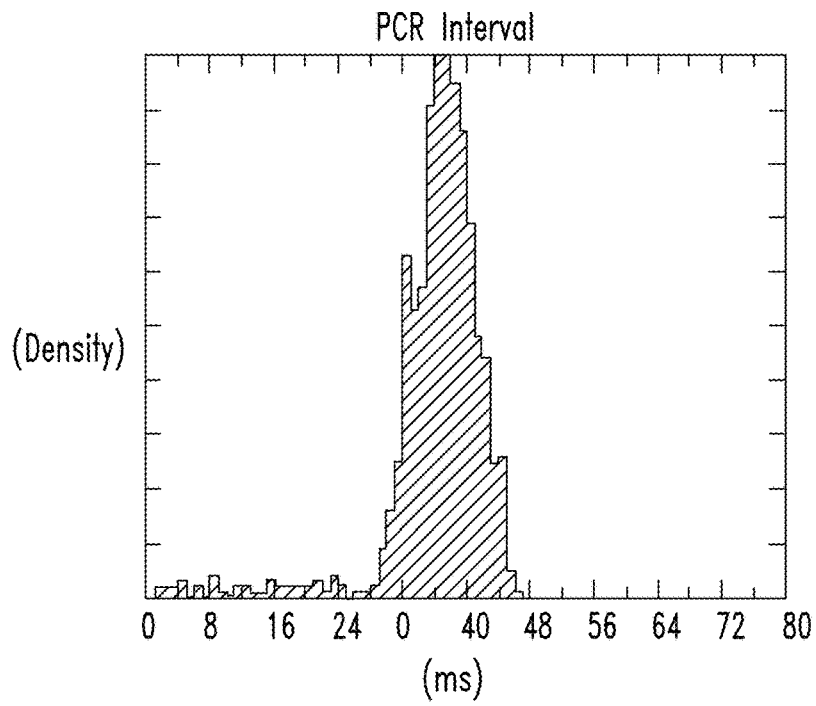
Figure 5 Distribution of PCR Interval before processing by IP Edge Modulator
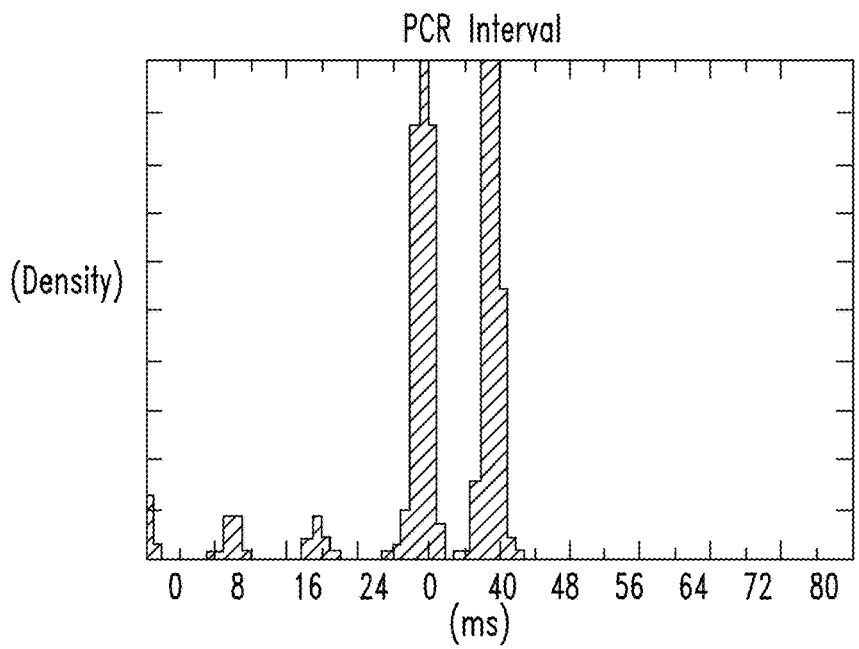
Figure 6 Distribution of PCR Interval after processing by prior art IP Edge Modulator

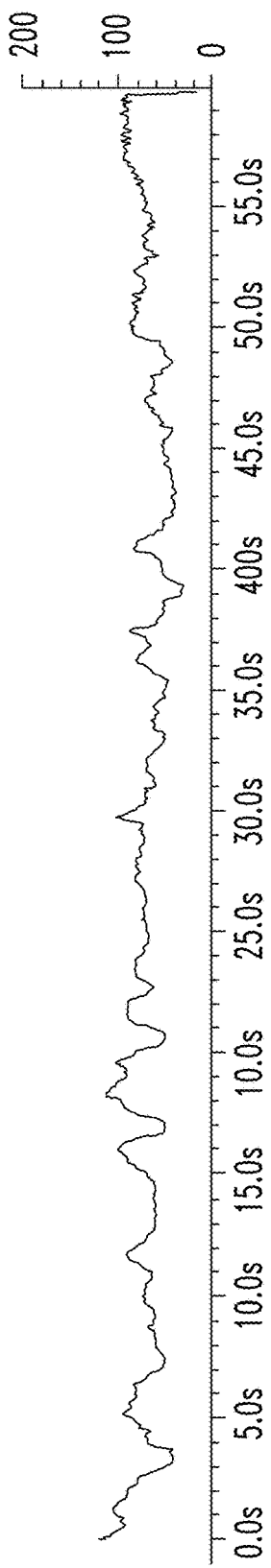
Figure 7 UDP packets/100msec for SPTS Received at IP Edge Modulator
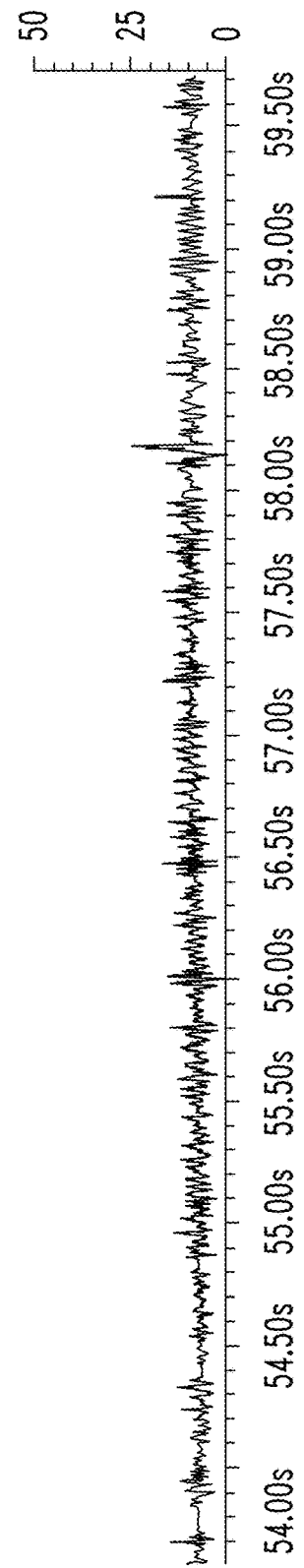
Figure 8 UDP packets/10msec for SPTS from Receiver to IP Edge Modulator

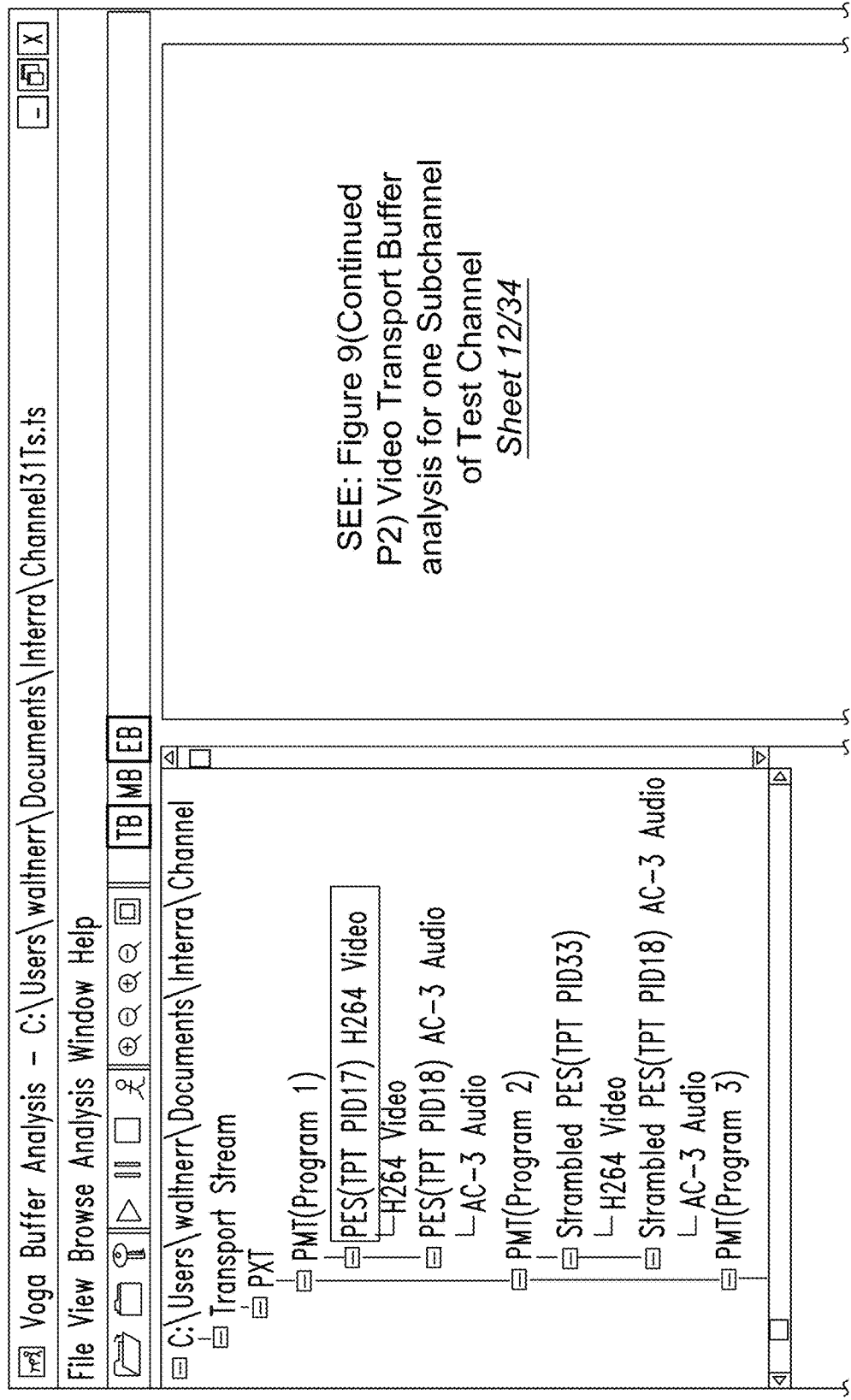
Figure 9 Video Transport Buffer analysis for one Subchannel of Test Channel

| Field | Value |
|---|---|
| No. of TB Overflow ... | 5904 |
| No. of TB Underflow... | 0 |
| No. of MB Overflow ... | 0 |
| No. of MB Underflow... | 0 |
| No. of EB Overflow ... | 0 |
| No. of EB Underflow... | 0 |

Summary | Point Info

SEE: Figure 9(Continued P2)
Video Transport Buffer
analysis for one Subchannel
of Test Channel
*Sheet 12/34*

25 errors per page

| Number | File-offset | Stream-location | Section | Description |
|---|---|---|---|---|
| 1201 | N.A. | N.A. | N.A. | Buffer analysis started... |
| 1212 | N.A. | N.A. | 2.4.2.6 | TB Buffer Overflow observed at time = 9 msecs. |
| 1214 | N.A. | N.A. | 2.4.2.6 | TB Buffer back to normal at time = 10 msecs. |
| 1212 | N.A. | N.A. | 2.4.2.6 | TB Buffer Overflow observed at time = 19 msecs. |
| 1214 | N.A. | N.A. | 2.4.2.6 | TB Buffer back to normal at time = 20 msecs. |
| 1212 | N.A. | N.A. | 2.4.2.6 | TB Buffer Overflow observed at time = 29 msecs. |
| 1214 | N.A. | N.A. | 2.4.2.6 | TB Buffer back to normal at time = 30 msecs. |
| 1212 | N.A. | N.A. | 2.4.2.6 | TB Buffer Overflow observed at time = 39 msecs. |

Figure 9(Continued P1) Video Transport Buffer analysis for one Subchannel of Test Channel

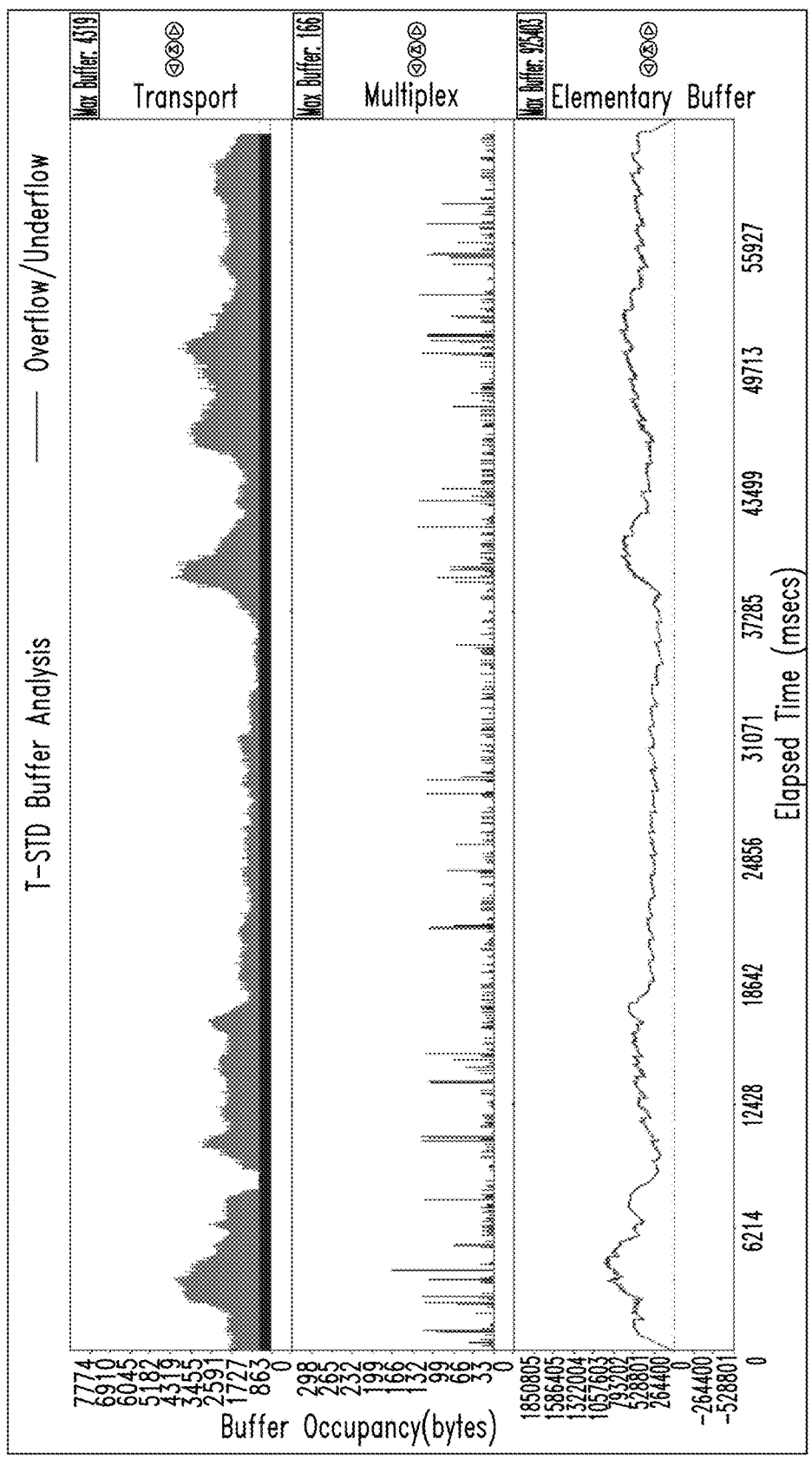
Figure 9(Continued P2) Video Transport Buffer analysis for one Subchannel of Test Channel

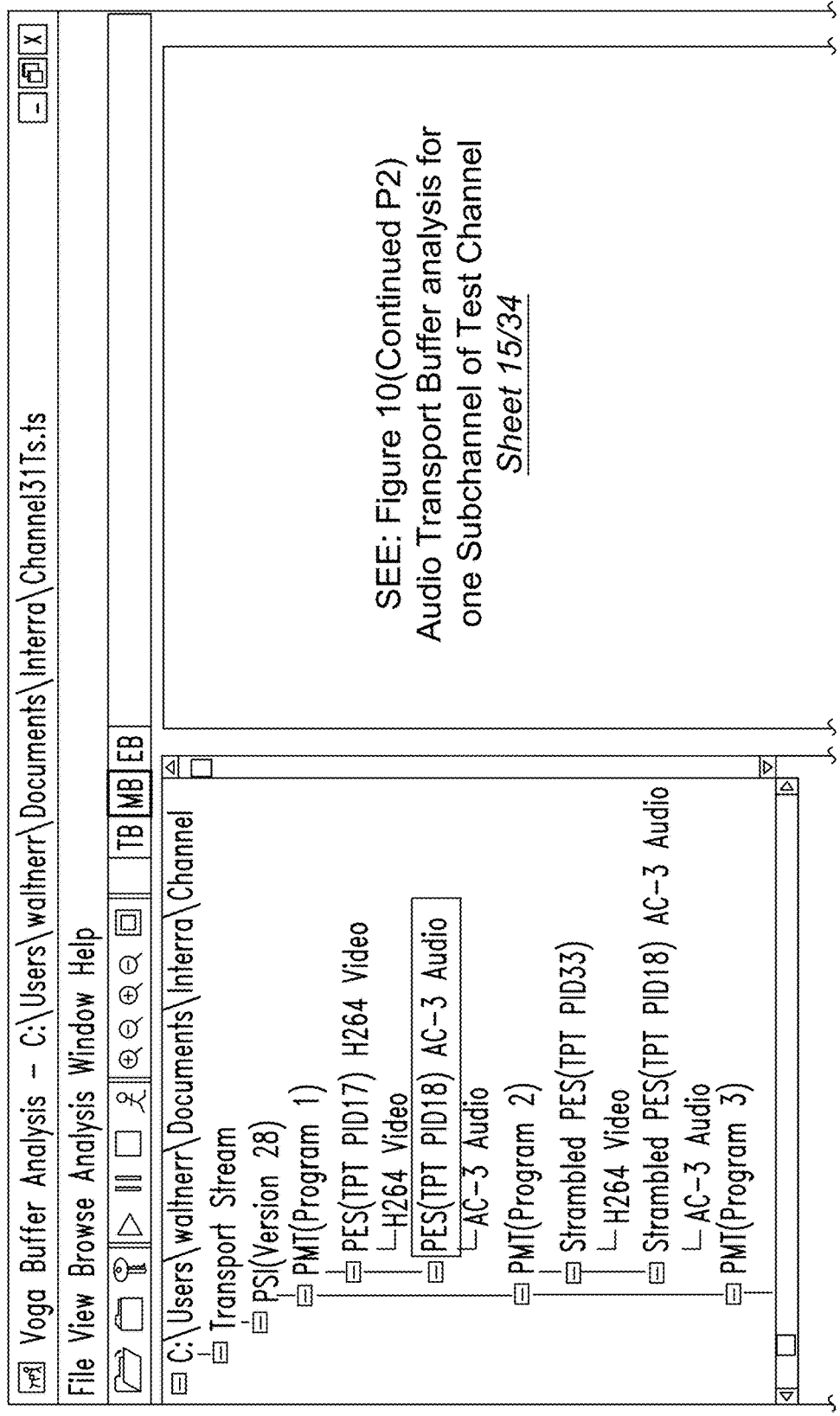
Figure 10 Audio Transport Buffer analysis for one Subchannel of Test Channel SEE: Figure 10(Continued P2)
Audio Transport Buffer analysis for
one Subchannel of Test Channel
*Sheet 15/34*

| Field | Value |
|---|---|
| No. of TB Overflow ... | 37 |
| No. of TB Underflow... | 0 |
| No. of EB Overflow ... | 0 |
| No. of EB Underflow... | 0 |

| Summary | Point Info |

25 errors per page

| Number | File-offset | Stream-location | Section | Description |
|---|---|---|---|---|
| ⊙ 1201 | N.A. | N.A. | N.A. | Buffer analysis started... |
| ⊗ 1212 | N.A. | N.A. | 2.4.2.6 | TB Buffer Overflow observed at time = 8550 msecs. |
| ⊙ 1214 | N.A. | N.A. | 2.4.2.6 | TB Buffer back to normal at time = 8550 msecs. |
| ⊗ 1212 | N.A. | N.A. | 2.4.2.6 | TB Buffer Overflow observed at time = 8720 msecs. |
| ⊙ 1214 | N.A. | N.A. | 2.4.2.6 | TB Buffer back to normal at time = 8720 msecs. |
| ⊗ 1212 | N.A. | N.A. | 2.4.2.6 | TB Buffer Overflow observed at time = 8850 msecs. |
| ⊙ 1214 | N.A. | N.A. | 2.4.2.6 | TB Buffer back to normal at time = 8850 msecs. |
| ⊗ 1212 | N.A. | N.A. | 2.4.2.6 | TB Buffer Overflow observed at time = 8971 msecs. |

Figure 10(Continued P1) Audio Transport Buffer analysis for one Subchannel of Test Channel

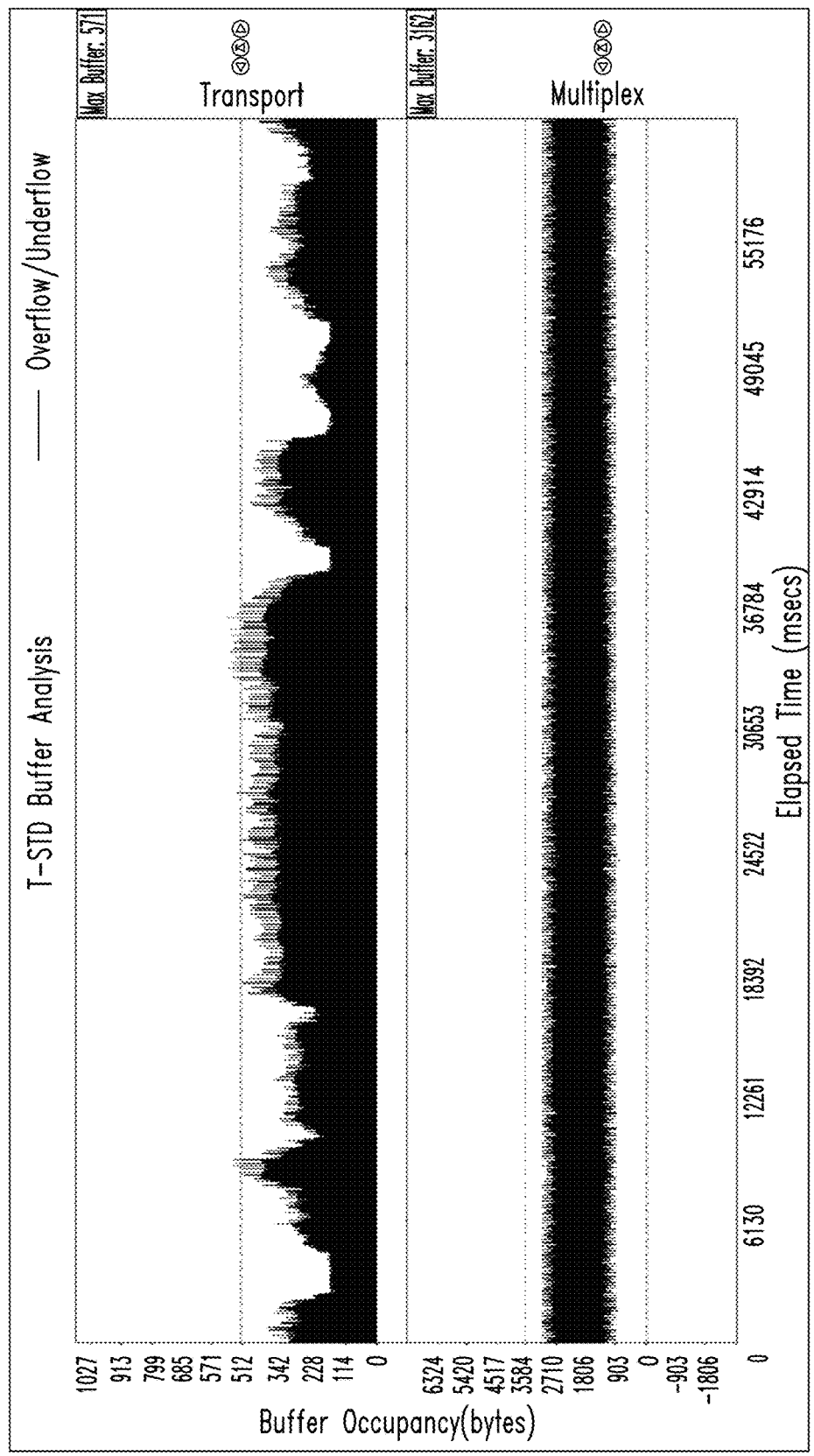
Figure 10(Continued P2) Audio Transport Buffer analysis for one Subchannel of Test Channel

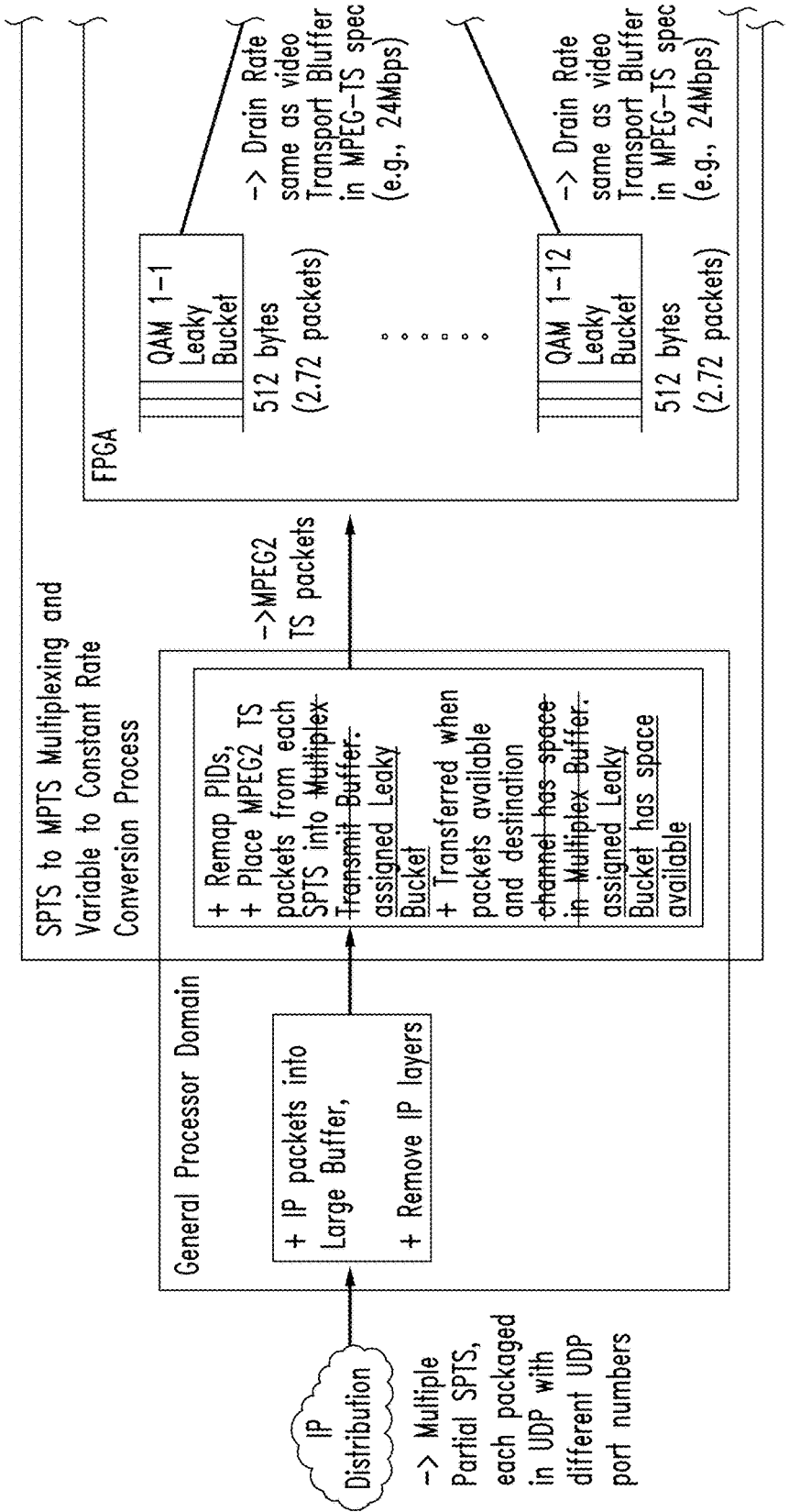
Figure 11 Single Channel of Typical QAM Modulator with Small Leaky Buckets before Re-multiplex Function

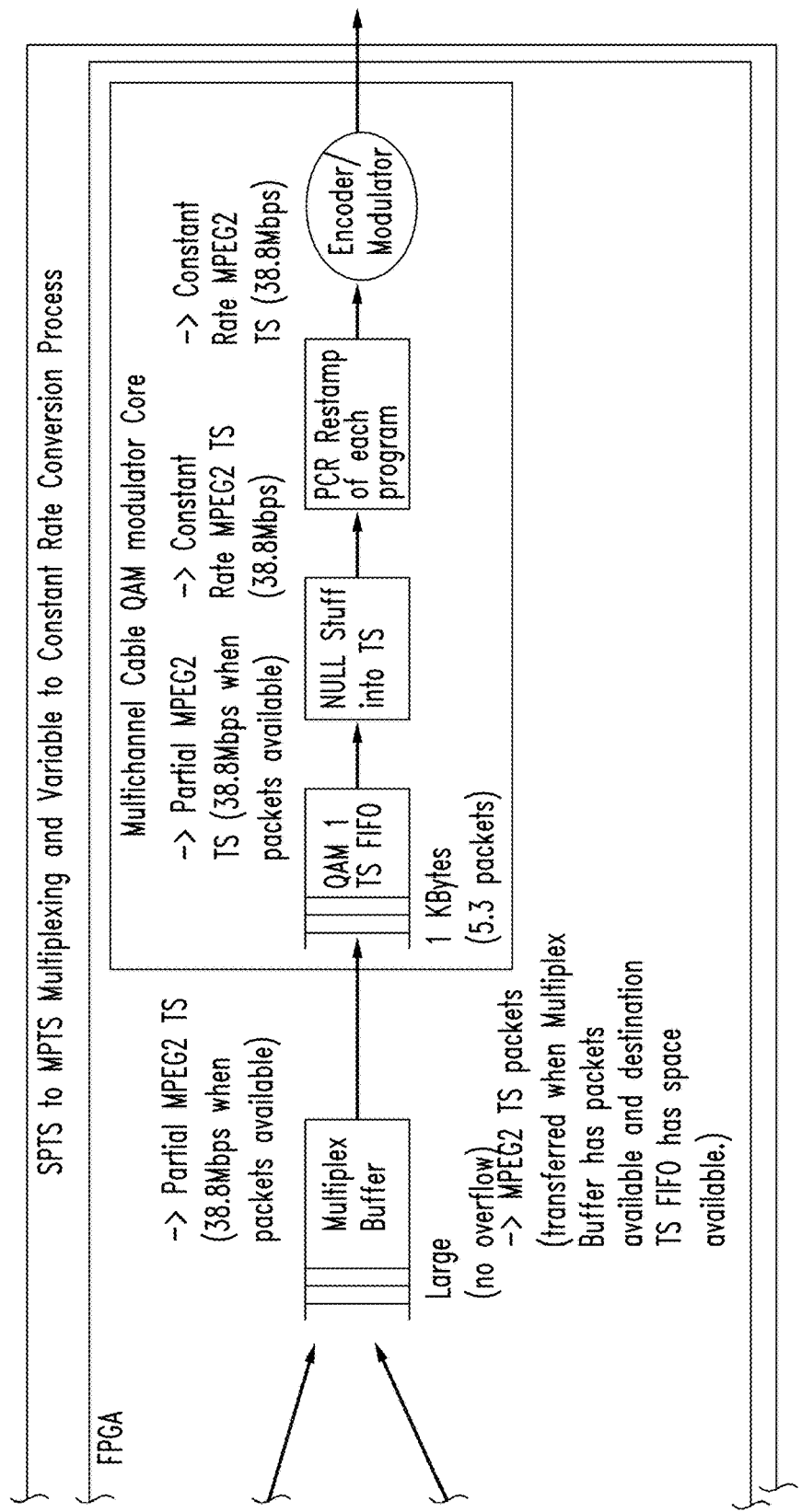
Figure 11(Continued) Single Channel of Typical QAM Modulator with Small Leaky Buckets before Re-multiplex Function

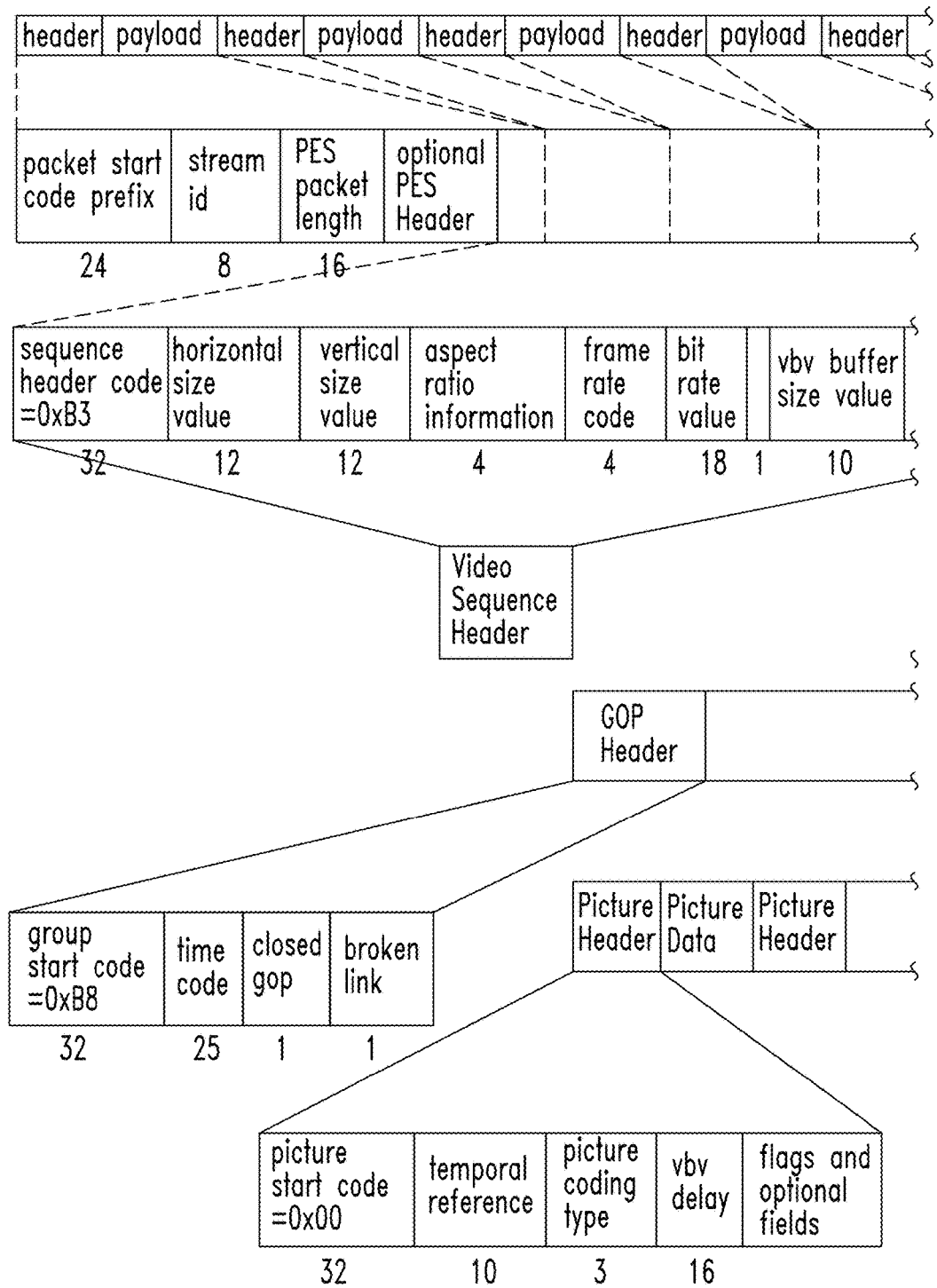
Figure 12 Parsing for bit_rate_value and stream_id

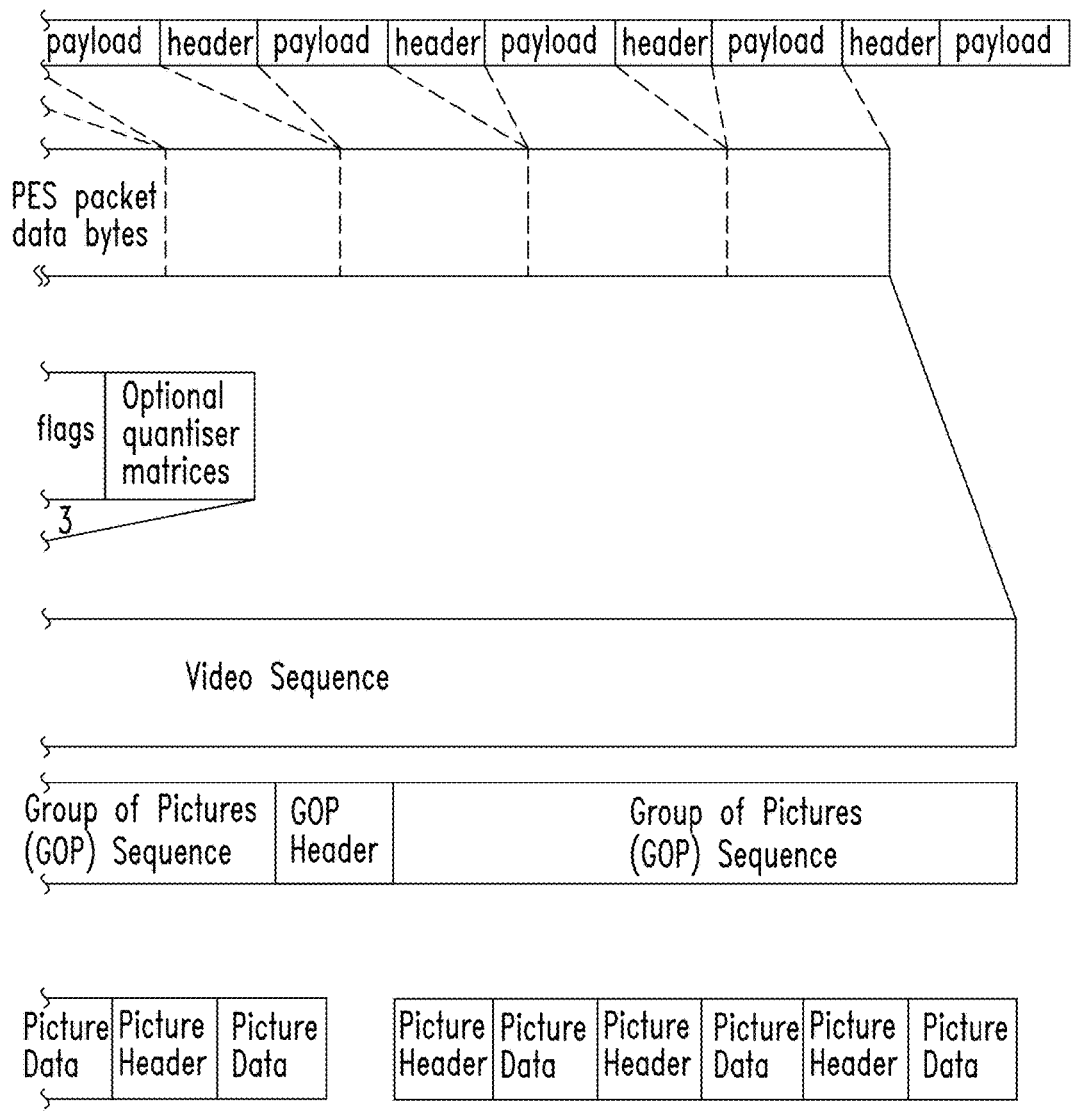
Figure 12(Continued) Parsing for bit_rate_value and stream_id

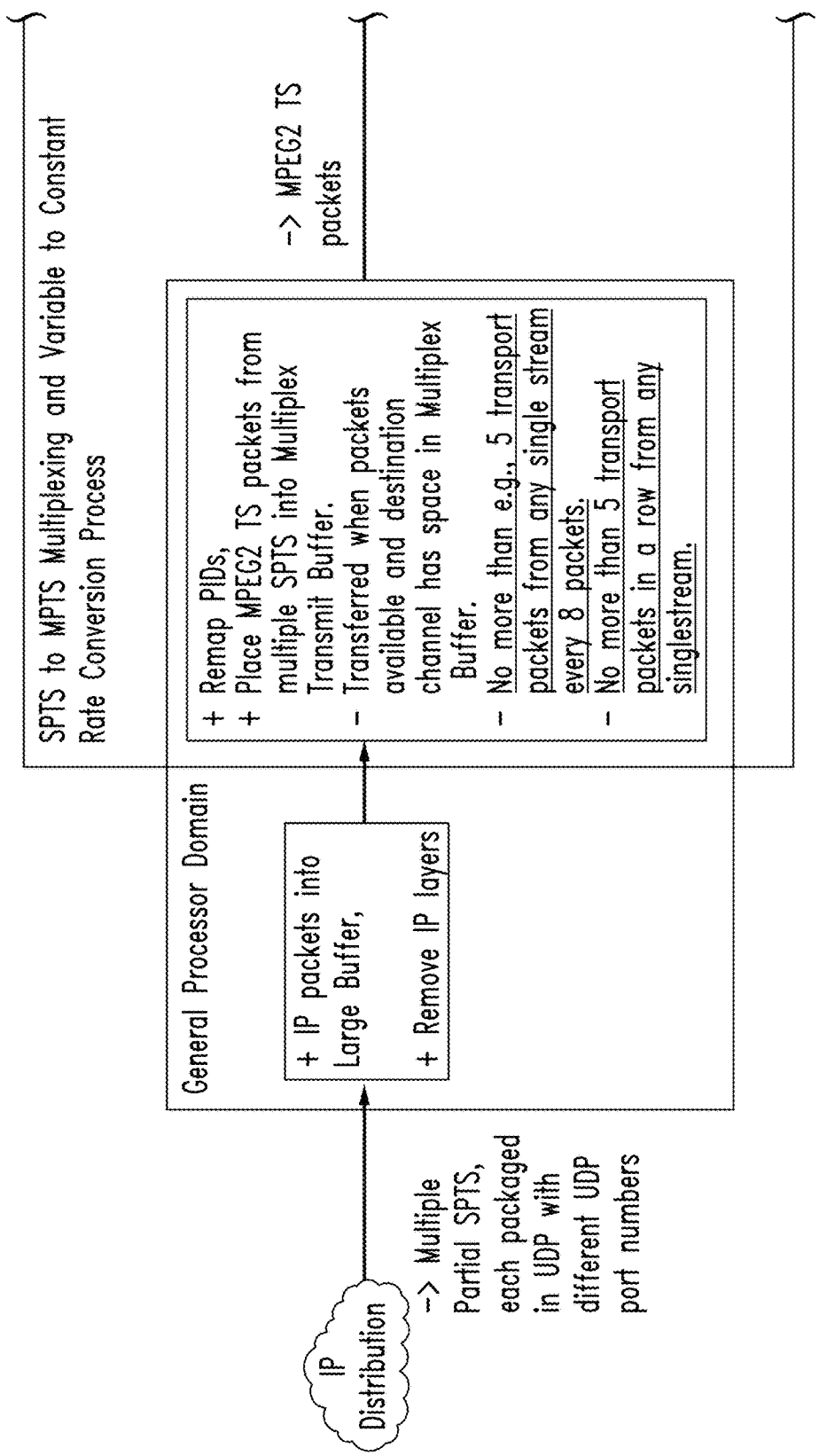
Figure 13 Single Channel of Typical QAM Modulator with function to limit number of consecutive packets from each SPTS

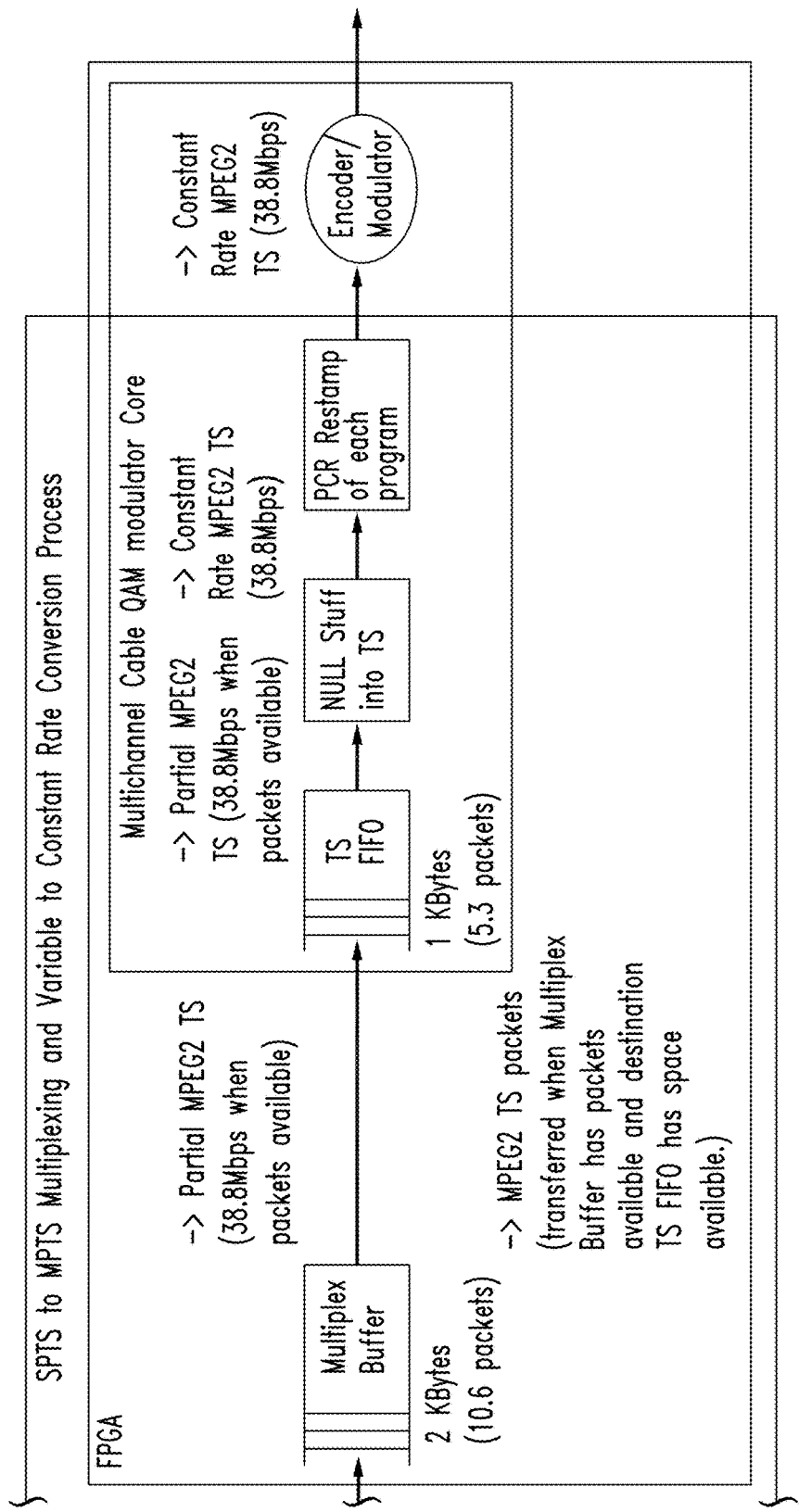
Figure 13(Continued) Single Channel of Typical QAM Modulator with function to limit number of consecutive packets from each SPTS

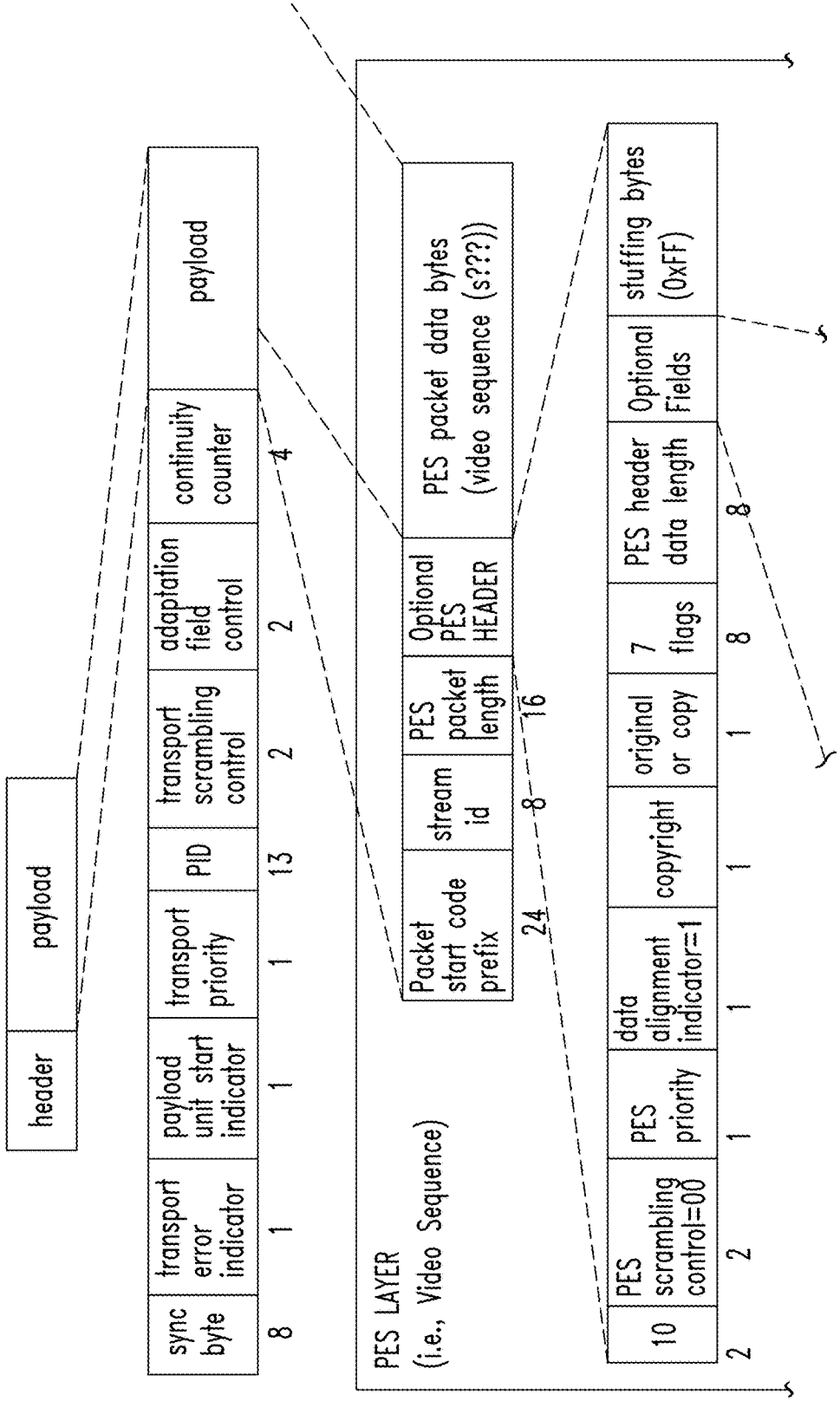
Figure 14 Parsing for PTS in Video PES Layers

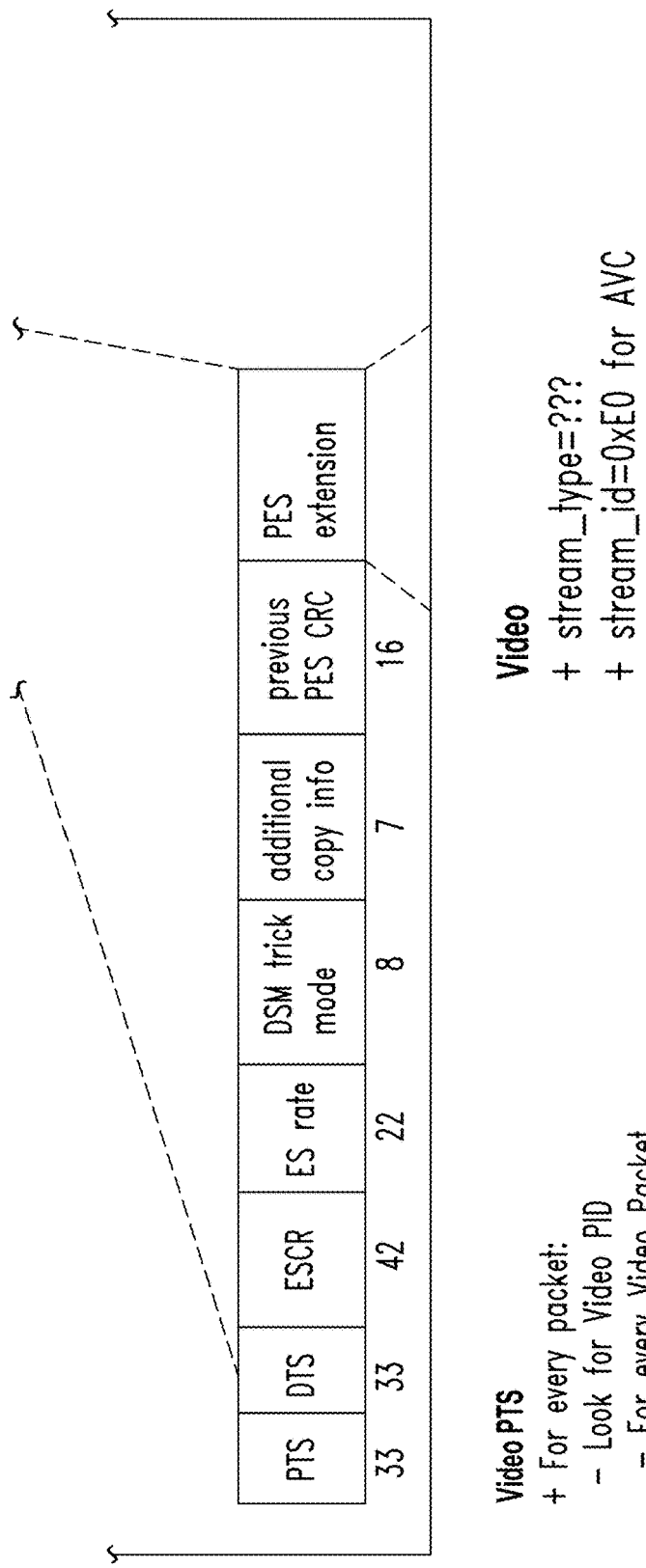
Figure 14(Continued) Parsing for PTS in Video PES Layers

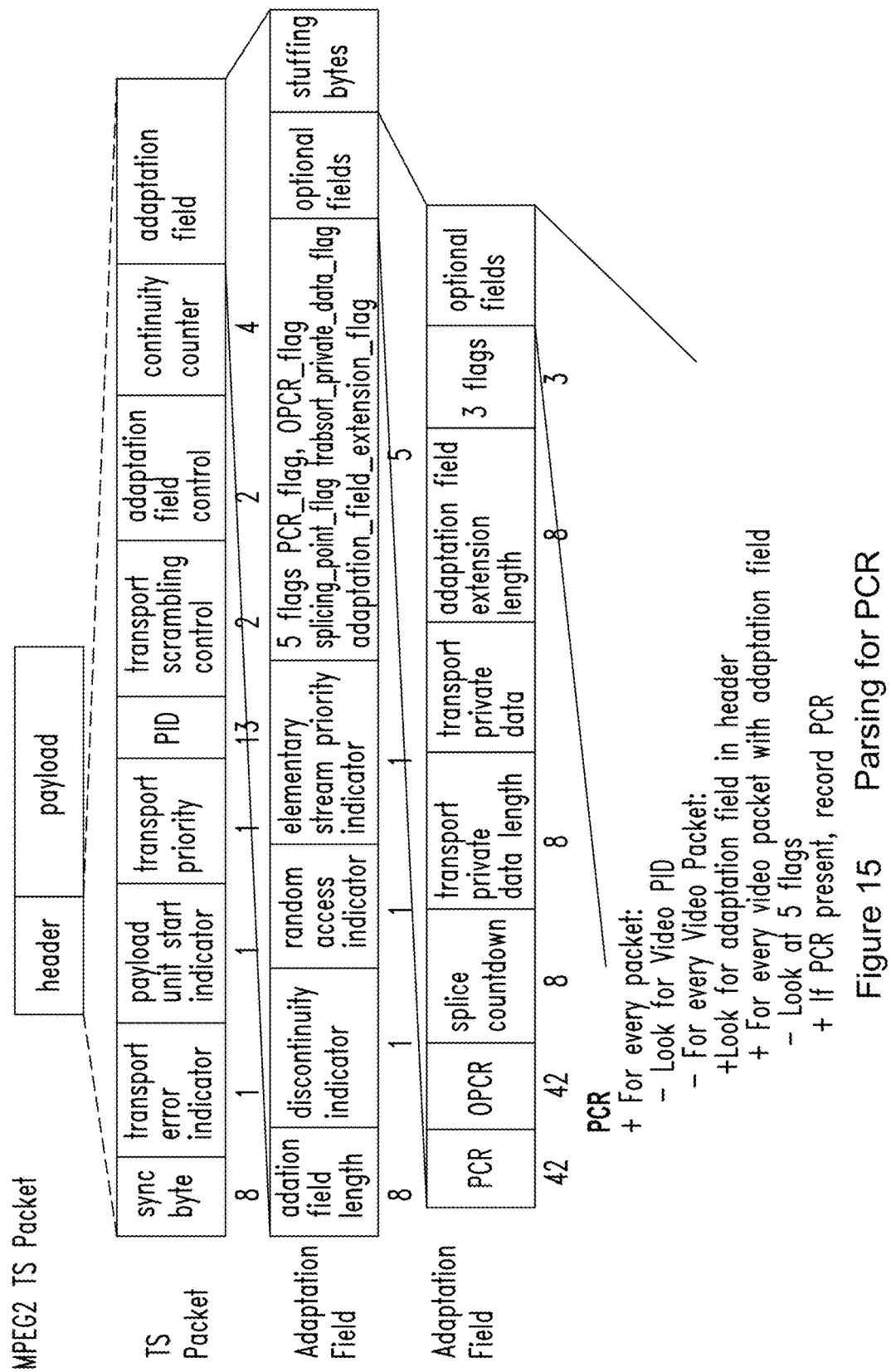
Figure 15  Parsing for PCR

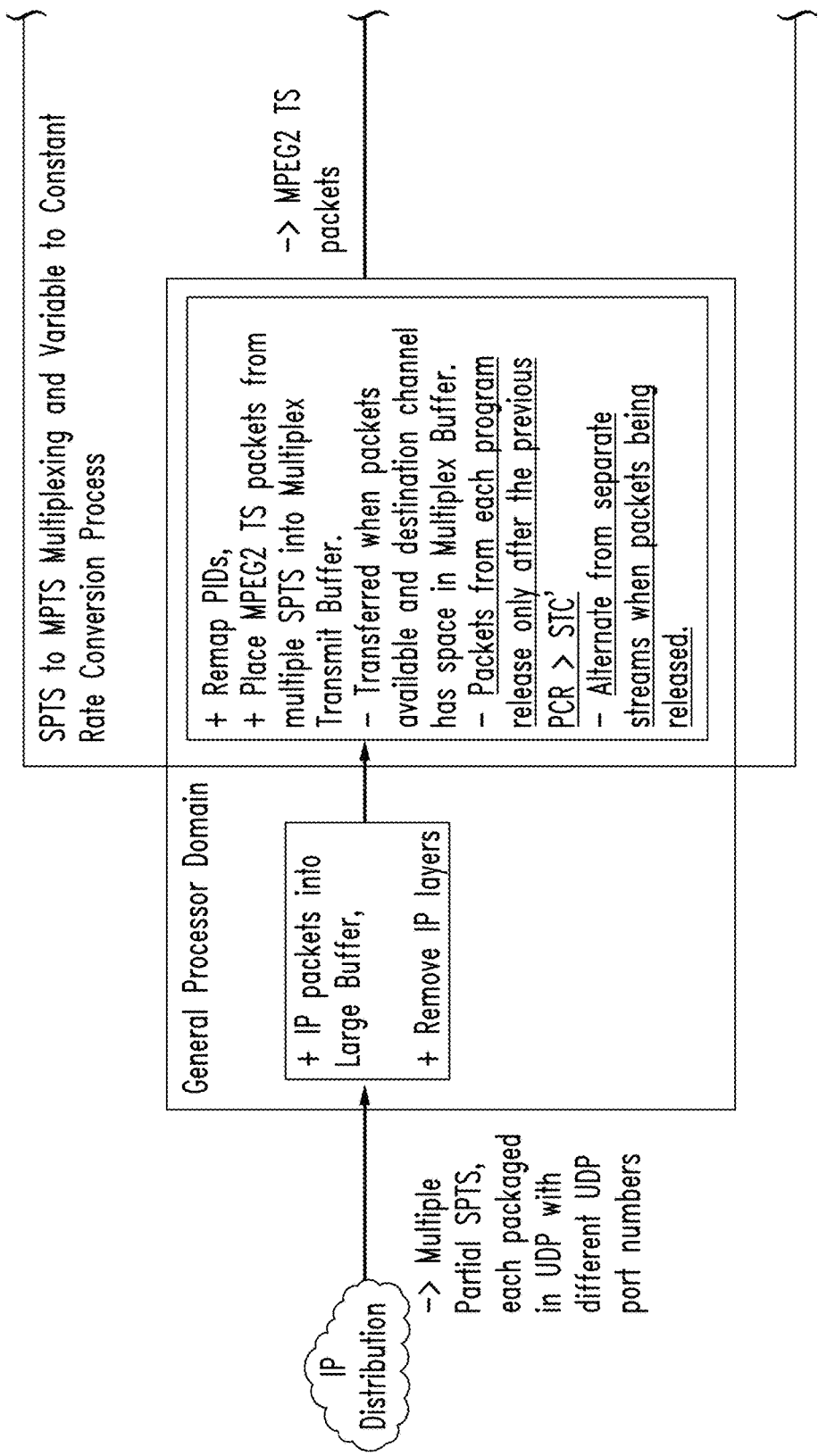
Figure 16 Single Channel of Typical QAM Modulator with function to read and use multiple PCR's during Remux

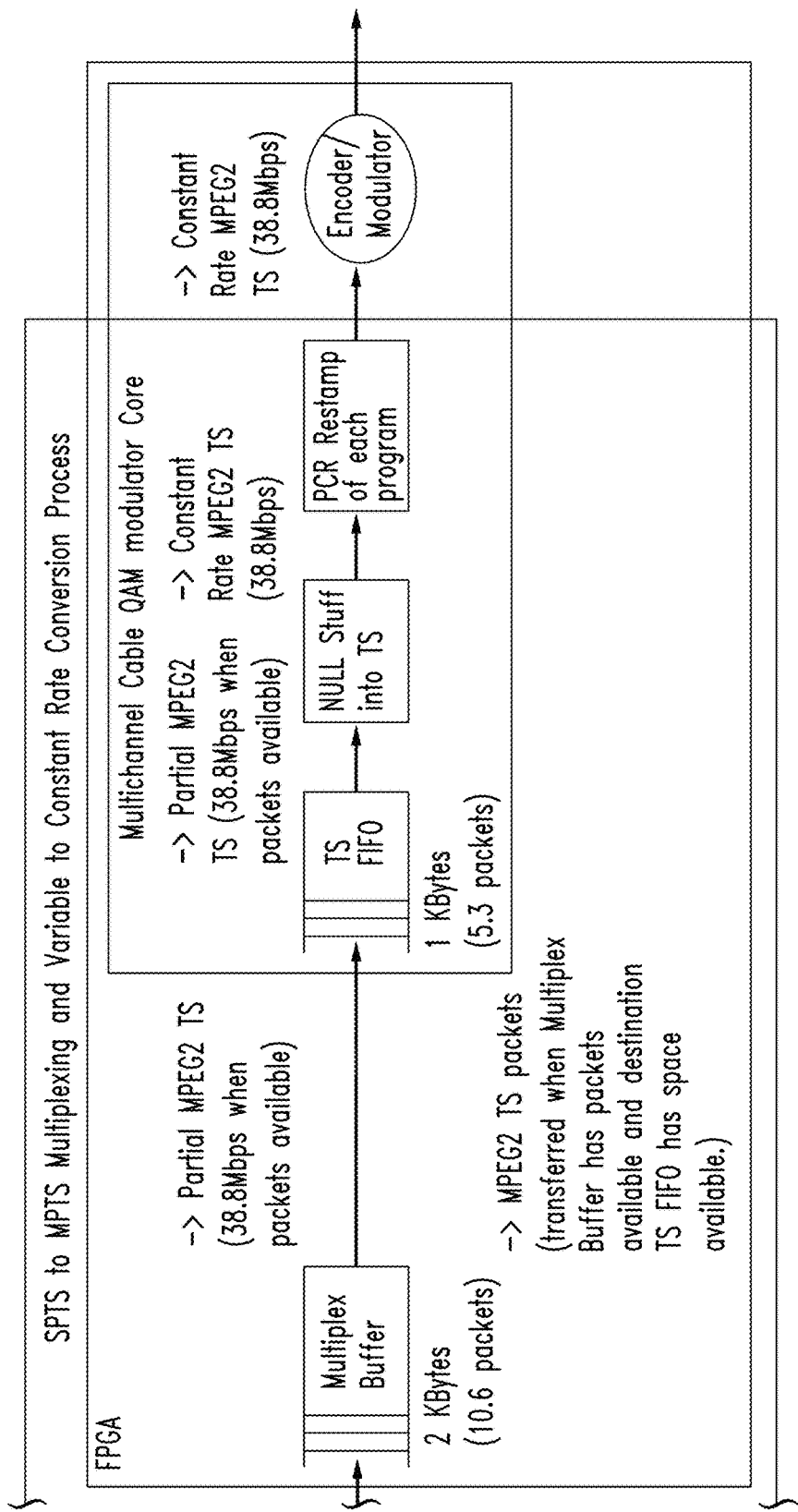
Figure 16(Continued) Single Channel of Typical QAM Modulator with function to read and use multiple PCR's during Remux

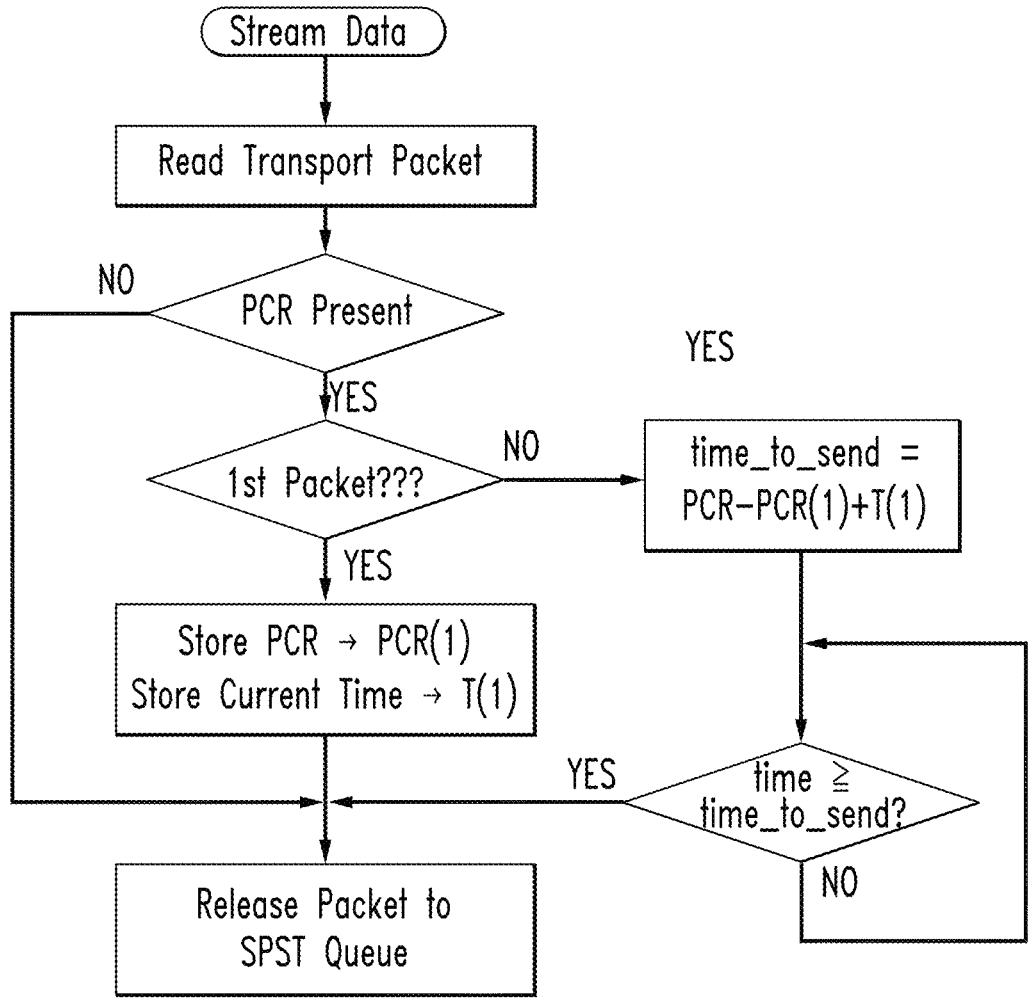
Figure 17A Flowcharts: Using PCR to hold up data until PCR matches QAM STC' (applies to single program)

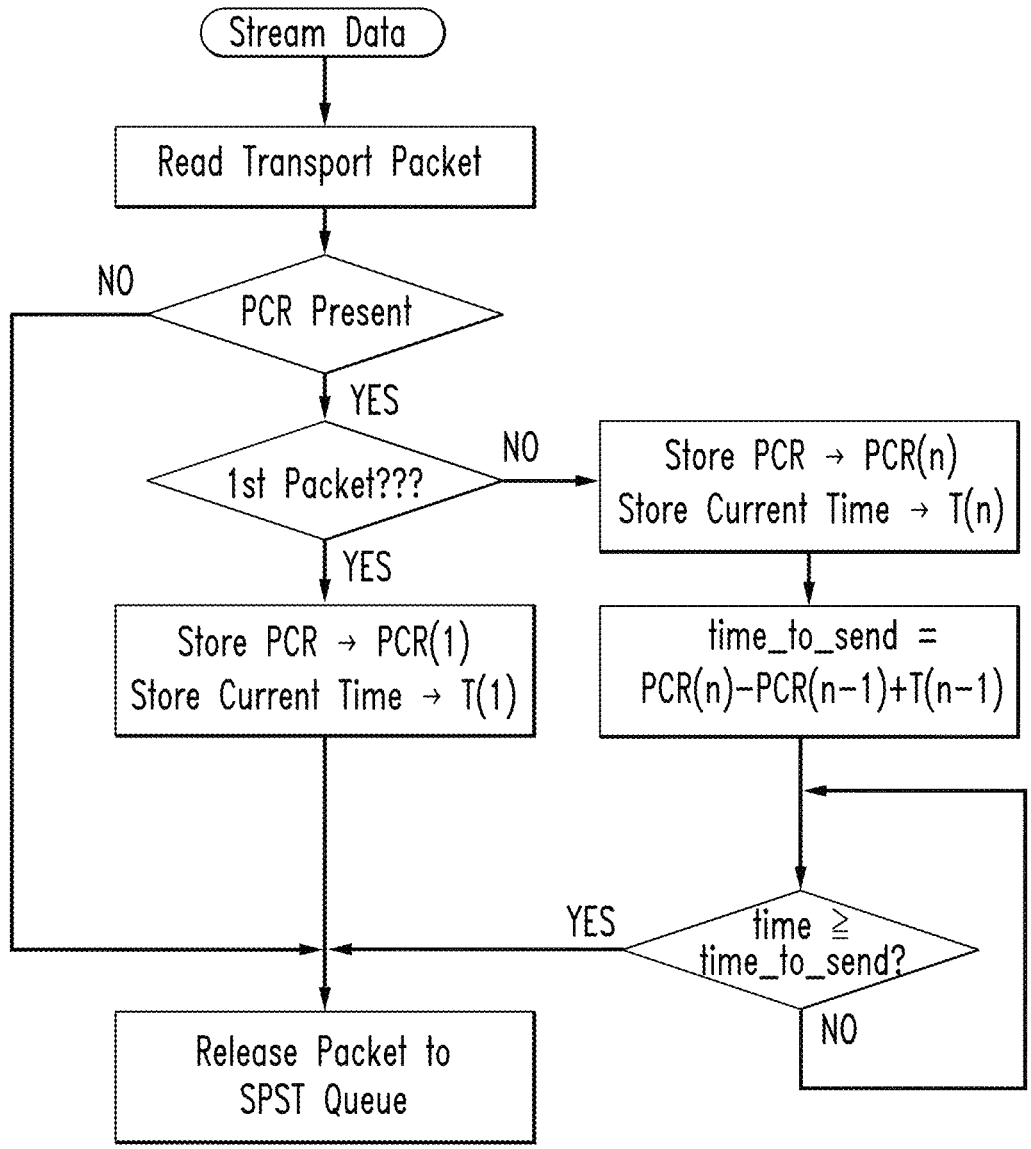
Figure 17B Flowcharts: Using PCR to hold up data until PCR matches QAM STC' (applies to single program)

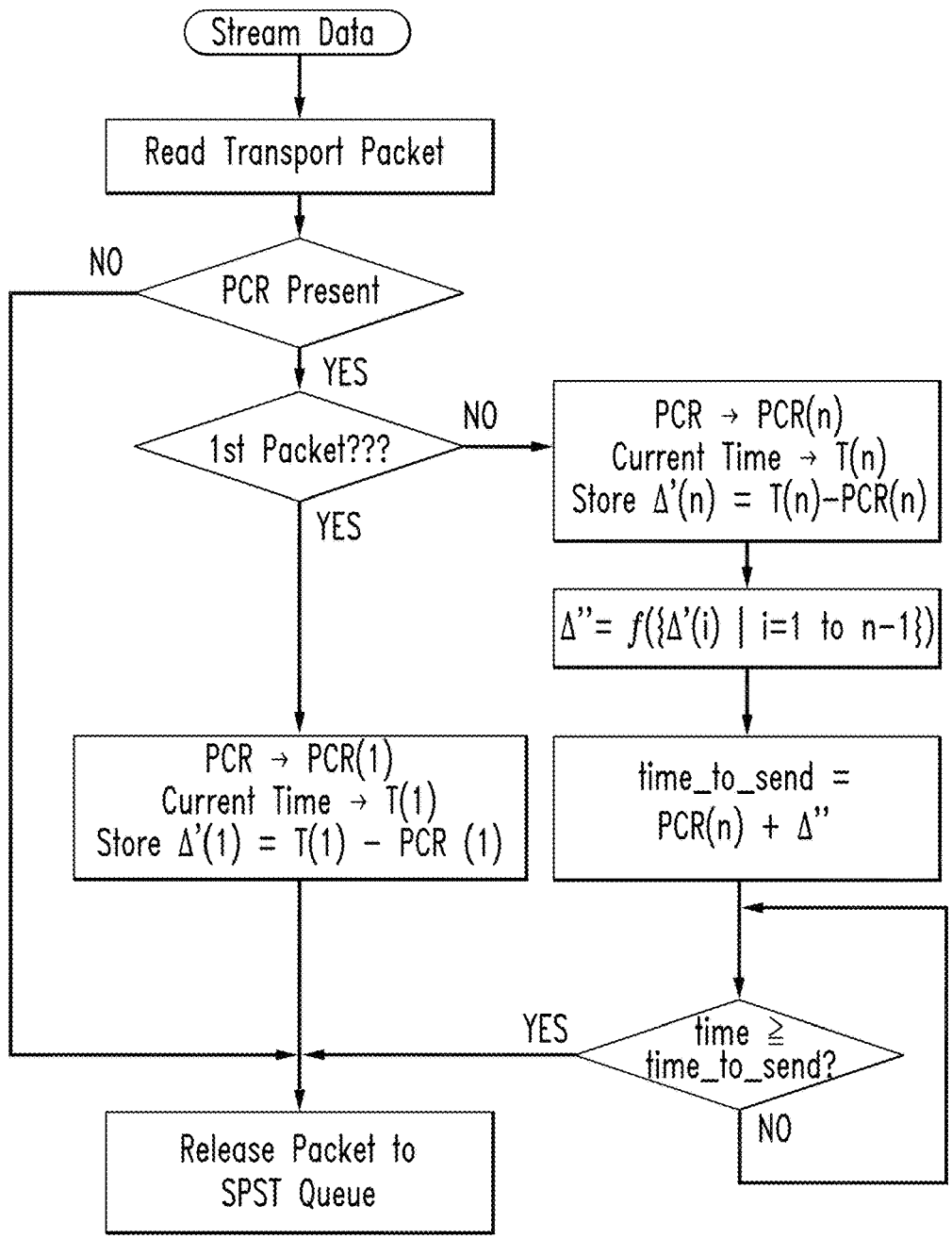
Figure 17C Flowcharts: Using PCR to hold up data until PCR matches QAM STC' (applies to single program)

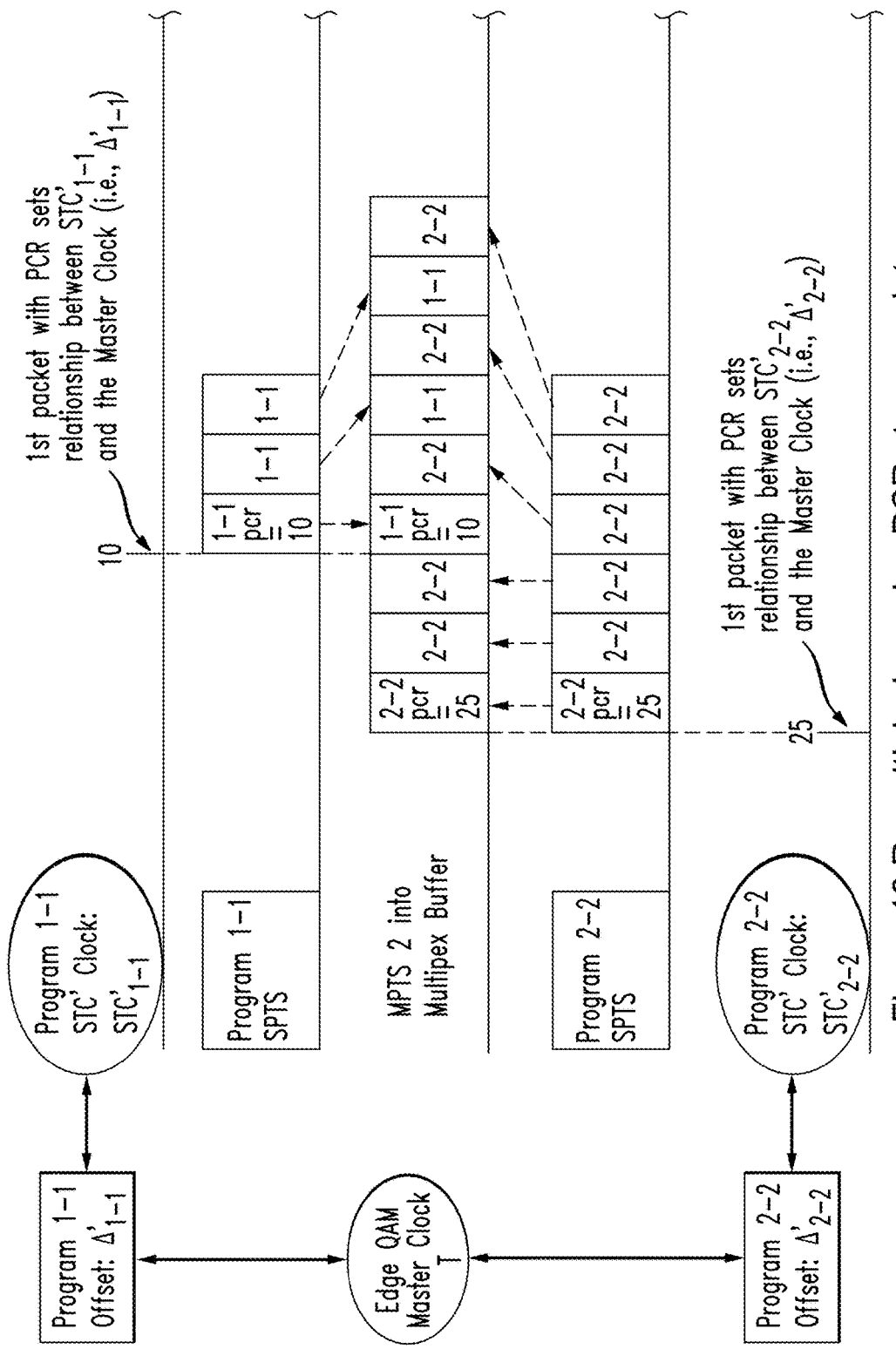
Figure 18 Remultiplexing using PCRs to pace data

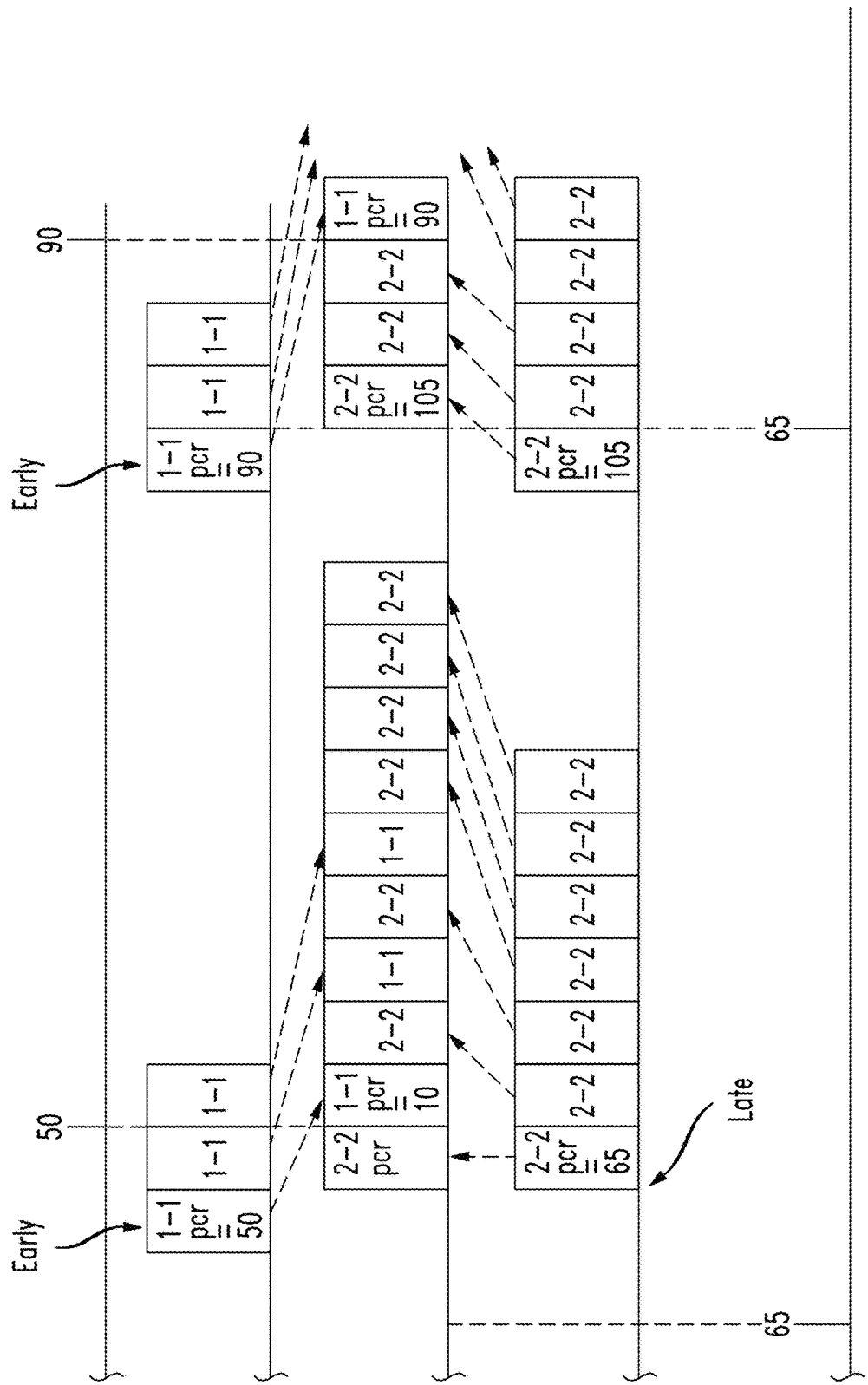
Figure 18(Continued) Remultiplexing using PCRs to pace data

METHOD AND APPARATUS FOR MINIMIZING TIMING ARTIFACTS IN REMULTIPLEXING

This application claims the benefit, under 35 U.S.C. § 119(e) of U.S. Provisional Application No. 62/092,998, filed Dec. 17, 2014.

TECHNICAL FIELD

The present principles relate generally to methods and apparatus for minimization of timing artifacts in a remultiplexing process.

BACKGROUND

The radio frequency (RF) signal for a standard television channel is able to carry multiple digital television programs simultaneously. Consequently, Edge QAMs used in the hospitality industries (e.g., hotels) include a remultimplexer function. The remultiplexer takes Transport Stream (TS) packets from several single program transport streams (SPTS) and inserts them into a multiple program transport stream (MPTS) for the respective television channel. Most of the Edge QAMs receive the input streams on an Internet Protocol (IP) interface. Because of the relatively large and often uncertain dynamically varying delays in the IP stack and input buffer, in some implementations the internal remultiplexer restamps the TS packets with a new program clock reference (PCR). This often creates timing artifacts that are noticeable on some digital televisions (DTVs).

SUMMARY

These and other drawbacks and disadvantages of the prior art are addressed by various described embodiments, which are directed to methods and apparatus for minimization of timing artifacts in remultiplexing, such as used in Edge QAMs.

According to one general aspect, a plurality of single program transport streams are controlled during remultiplexing to a multi program transport stream. At least one SPTS is buffered and calculations are performed to determine a rate of transfer of transport packets to a multiplex buffer. The transport packets are transferred to a multiplex buffer at the calculated rate.

According to another general aspect, control of the remultiplexing of a plurality of single program transport streams to a multi program transport stream is achieved by limiting a number of consecutive packets being transferred from any particular single program transport stream, and controlling the multiplex frequency from any particular stream.

According to yet another general aspect, control of a plurality of single program transport streams during remultiplexing to a multi-program transport stream is based on using multiple program clock reference values such that packets from each single program transport stream are released only after a previous program clock reference value is greater than the system time.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

The present principles may be better understood in accordance with the following exemplary figures, in which:

FIG. 1 and FIG. 1 (Continued) shows an example hospitality system.

FIG. 2 and FIG. 2 (Continued) shows a typical QAM modulator with transport stream remultiplexing.

FIG. 3 and FIG. 3 (Continued) shows a single channel of a typical QAM modulator with transport stream remultiplexing.

FIG. 4 shows an MPEG-2 transport stream system target decoder

FIG. 5 shows a distribution of program clock reference interval before processing by an IP edge modulator.

FIG. 6 shows a distribution of program clock reference interval after processing by a prior art IP edge modulator.

FIG. 7 shows UDP packets for received single program transport stream.

FIG. 8 shows UDP packets for single program transport streams from a receiver to an IP edge modulator.

FIG. 9, FIG. 9 (Continued P1), and FIG. 9 (Continued P2) shows a video transport buffer analysis for one test subchannel.

FIG. 10, FIG. 10 (Continued P1), and FIG. 10 (Continued P2) shows an audio transport buffer analysis for one test subchannel.

FIG. 11 and FIG. 11(Continued) shows a single channel of a typical QAM modulator with small leaky buckets before transport stream remultiplexing.

FIG. 12 and FIG. 12 (Continued) shows parsing of transport stream.

FIG. 13 and FIG. 13 (Continued) shows a single channel of QAM Modulator with function to limit number of consecutive packets from each SPTS.

FIG. 14 and FIG. 14 (Continued) shows parsing of stream for PTS in video PES layers.

FIG. 15 (Continued) shows parsing of stream for program clock reference.

FIG. 16 and FIG. 16 (Continued) shows single channel of QAM Modulator with function to read and use multiple PCR's during remultiplexing.

FIG. 17A shows flow diagrams of using PCR to hold up data until PCR matches QAM STC', shown for a single program FIG. 17B shows flow diagrams of using PCR to hold up data until PCR matches QAM STC', shown for a single program.

FIG. 17C shows flow diagrams of using PCR to hold up data until PCR matches QAM STC', shown for a single program.

FIG. 18 and FIG. 18(Continued) shows example timing diagrams of remultiplexing using PCRs to pace data.

DETAILED DESCRIPTION

Figure 19:
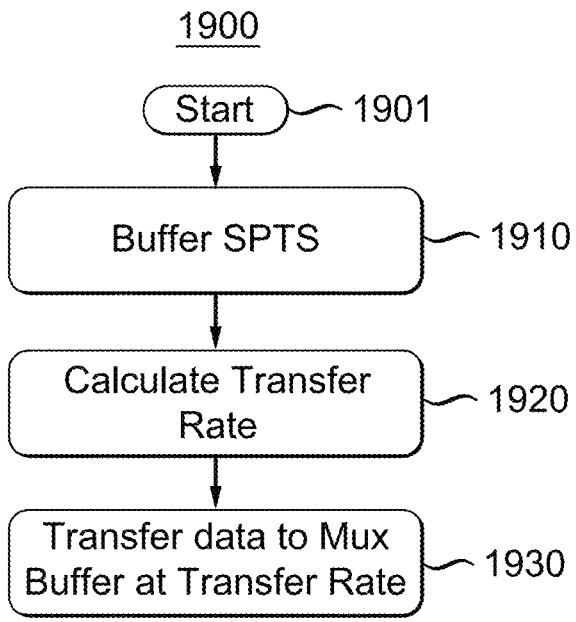
FIG. 19 shows an embodiment of a method using the present principles.
Figure 20:
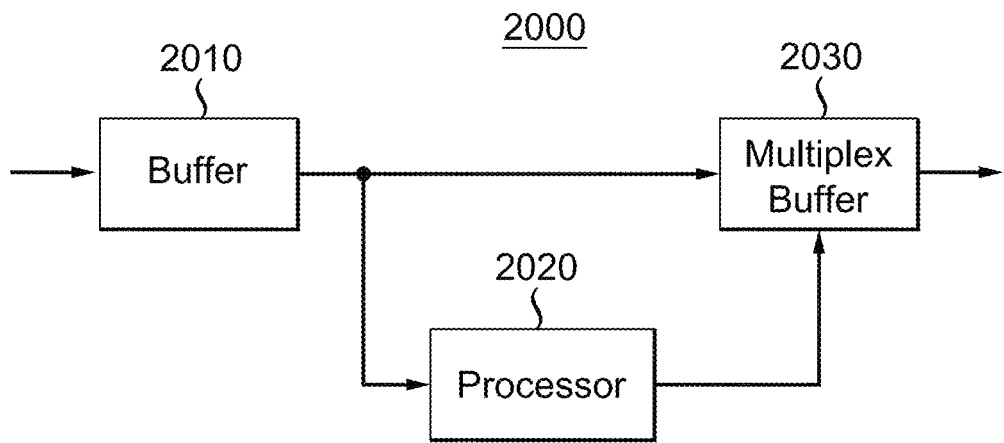
FIG. 20 shows an embodiment of an apparatus using the present principles.

The described embodiments are directed to methods and apparatus for transporting digital multimedia signals, such as television programs, to customer equipment, and more particularly to audio-video program distribution systems that convert a plurality of single program transport streams (SPTS) into a multiple program transport stream (MPTS).

In particular, the described embodiments can be used in IP Edge Modulators such as the cable quadrature amplitude modulation (QAM) modulators used in a hotel entertainment system to re-modulate and distribute TV programming that originates from a different broadcast network, such as a Satellite Video Broadcast System. Timing artifacts can occur when several single program transports streams are remultiplexed into a multi-program transport stream. Some hotels use entertainment systems that receive video signals from satellite service providers and then rebroadcast video programs in stacked quadrature amplitude modulation (QAM) RF channels. Each QAM channel can carry up to approximately 12 Standard Definition (SD) programs or 3 High Definition (HD) programs. Quite often, the infrastructure between the satellite receivers and the QAM is a jitter-inducing IP network. It is difficult to multiplex unrelated Single Program Transport Streams (SPTS) into a Multi-Program Transport Stream (MPTS) while minimizing introduced timing artifacts. Several low-cost methods that greatly reduce the possibility and magnitude of Transport Stream-System Target Decoder (TS-STD) buffer overflow violations.

An example Satellite to Cable Re-broadcast System is shown in FIG. 1.

FIG. 2 shows a typical IP edge QAM modulator. It includes an IP network interface for receiving the Ethernet frames. The Ethernet Frames are stored in a large buffer and then applied to an IP stack that recovers the MPEG2 transport stream (TS) packets. Those TS packets are analyzed in a manner that identifies their associated program. The program identifiers (PIDs) in the Program Association Table (PAT), Program Map Tables (PMTs), and MPEG2-TS packet headers are changed (remapped) to prepare for multiplexing sub-channels that will be broadcast in the same RF channel. From here, the MPEG2-TS packets go into multiplexers, one for each RF output channel. The purpose of the multiplex operation is to combine multiple variable-rate SPTS's into a constant rate MPTS prior to modulation. The focus will be on the MPTS multiplex process from here forward.

There are several prior methods for remultiplexing.

A first prior art approach focuses on reducing latency in the remultiplexing process.

An example of how the SPTS to MPTS multiplex process is implemented is described below. It should be noted that the MPTS remultiplexing processes used in IP Edge Modulators do not produce MPEG2 MPTS's that are fully compliant with regards to timing. This is partially due to cost. A hotel operator cannot support the same level of equipment that can be supported by a national broadcaster. For low-cost IP Edge multiplexors, there is no re-encoding of the elementary stream (ES) and therefore statistical multiplexing cannot be accomplished. In a statistical multiplexing process, the rate of each ES is controlled so that the sum of all of the rates is less than the full transport stream rate. In other words, the rates of all of the streams in the multiplex are related. In the multiplexing process, there is no re-encoding. There may be several packets from different SPTS's that should be sent next, but only one can. So, in most cases, there is a compromise between cost and performance.

Another approach used in IP Edge QAM modulators is to use a QAM modulator IC or QAM modulator FPGA core to do the actual packet coding and modulation. In a second prior art method, each core can generate up to 4 QAM channels, each of which may carry multiple sub-channels. The multiplexing of the sub-channels into the channel is done by the processing that loads packets into the front end queue of each channel. Similar to other QAM modulators, this core contains several input modes. One mode that is used in this prior art device is the "PCR Re-stamping" mode.

TS PCR Restamping is useful in certain applications where some form of rate adaption is required. The TS PCR restamping extension core provides a TS interface to allow data to be input at any rate. The core will pad the input TS stream with NULL TS packets as required and perform any PCR adjustment. When the PCR restamping extension core is used, an output signal is provided that indicates the necessary 188-byte TS byte_rate to satisfy the on-air requirements. In this example, the output bitrate of each QAM channel is 38.8 Mbps.

The output stage clocks the data packets out of the multiplex buffer at a constant rate and then modulates the appropriate RF carrier for the designated television channel with that data. Because such television signal generation utilizes quadrature amplitude modulation, this type of IP edge multiplexer is often referred to as an "edge QAM."

Because the RF signal for a standard television channel is able to carry multiple digital television programs at the same time, the multiplexer's function is to create a transport stream containing the TS packets for those multiple programs. Thus, the multiplexer takes TS packets from several single program transport streams and inserts them into a multiple program transport stream for the respective television channel. Because of the relatively large and often uncertain dynamically varying delays in the IP stack and the input buffer, the internal multiplexer re-stamps the TS packets with a new program clock reference (PCR). The multiplexer also generates a new program map table and a new program association table to ensure proper construction of the MPTS.

The focus of the described embodiments is the process of converting multiple variable rate transport streams into a constant rate stream in an output RF channel. This includes the process of multiplexing multiple SPTS into a single MPTS. To simplify the explanation and drawings, the focus in the discussion will be on a single RF output channel of the Edge QAM. A single output channel of the example Edge QAM is shown in FIG. 3.

As each Ethernet frame is received, its group of transport stream packets is extracted and placed into a large input buffer. The conventional input buffer simultaneously stores groups of transport stream packets from a large number of Ethernet frames and a plurality of separate programs. The input buffer is implemented by a very large random access memory so that all the incoming TS packets can be stored until one can be processed by the respective modulator circuit. A relatively large amount of buffer memory is required to provide time for the IP Edge Multiplexer to construct the program specific information (PSI), specifically the PAT and the PMT, for the audio-video content being transported. The size of the input buffer varies dynamically based on the amount of incoming data that has to be stored before the multiplexers can process that data.

In this example implementation, when MPEG packets destined for a specific output channel are available and there is room in the associated Multiplex Buffer, packets are transferred to that buffer. Note that if there are 7 MPEG2-TS packets in each IP packet, then the Multiplex buffer can hold about 1½ IP packets. The packets are loaded based on their availability. In many cases, buffers for one program may be emptied before the processor sequentially processes another program. It is possible to have 7 packets from one program loaded into the buffer followed by another 7 from the same program.

Packets are transferred from the Multiplex Buffer (MB) to the TS FIFO (First In First Out) as long as there is a packet in the Multiplex Buffer and there is room in the TS FIFO. If the TS FIFO empties and there are no MPEG packets in the Multiplex Buffer, then the QAM Modulator Core inserts a NULL packet as previously explained. This is to maintain the necessary constant packet rate needed to produce the television channel output signal.

In addition to being syntactically correct, a MPTS must also meet certain timing constraints. This is usually handled by an expensive MPEG Statistical Multiplexer at the Broadcast Service Provider's head-end. Each SPTS must meet the buffer requirements in the MPEG Transport Stream System Target Decoder (TS-STD) without overflowing buffers. See FIG. 4. Additionally, each Elementary Stream (ES) must also not overflow ES buffers.

Some general TS-STD Rules for MPEG2-TS are shown below:

- A Transport Buffer (TB) shall empty at least once/sec.
- Program Clock Reference (PCR) associated with Presentation Units shall occur at least every 100 msec. Typical is every 40 msec. PCRs are carried in the adaptation field of TS packets and can be used to create a synchronized clock between the transmitter and receiver (assuming a well behaved channel). Data from the TS enters the T-STD at a piecewise constant rate between PCRs (bytes from all programs in the transport stream divided by the difference in PCRs from a specific program).
- The Presentation Time Stamp (PTS) shall be encoded into presentation units at least every 700 msec. The Decoding Time Stamps (DTS) are only present if different from PTS. PTS and DTS are contained in the PES (Packetized Elementary Stream) header.
- For many broadcast systems, there is one access unit (AU) per PES packet. This allows a PTS to be sent for every picture.
- $Rx_{video}=1.2\times R_{max}$[profile, level]. $R_{max}$ is specified in the Video Sequence Header. $Rx_{video}$ is the rate at which data is removed from the Transport Buffer (TB).
- The rate at which video (PES payload data) is removed from the MB, $Rbx_{video}=$
15 Mbps for SD using Leak Method. The Leak method is used when vbv_delay is not specified in the bitstream.
  min$\{1.05\times R_{es}; R_{max}\}$ for HD using Leak Method. $R_{es}$ is specified in video elementary stream.
- For the vbv_delay (Video Buffer Verifier delay) method, the time it takes to transfer a picture from the MB to the EB is vbv_delay. Therefore, the transfer of each picture is a piecewise constant rate derived from vbv_delay. vbv_delay is carried in the Picture Header for MPEG2-TS.
- For some broadcast systems, the coded vbv_buffer_size is less than or equal to 7,995,392 bits (vbv_buffer_size≤488) and the vbv_delay is less than or equal to 0.5 seconds (vbv_delay≤45000). vbv_buffer_size is an 18-bit integer specifying the size (in units of 2048 bytes) of the VBV and carried in Sequence Header. vbv_delay is an 16-bit integer whose value is the number of periods of a 90 KHz clock derived from the 27 MHz system clock that the VBV shall wait after receiving the final byte of the picture start code before the decoding the picture. The vbv_buffer_size and vbv_delay limit the allowed fluctuations in the video portion of the bit stream.

A timing model of an STD can be found in Annex D of the MPEG2-1 system specification.

The IP stack in the receivers and the input buffer of the IP edge modulator introduce significant jitter in the transmission of the TS packets for each program. Specifically, the IP stack introduces an indeterminate and varying delay, which can be up to an additional ½ second.

Although by using the PCR Restamping function shown in FIG. 3, PCR jitter is reduced to a reasonable value, the relationship between the PCR of a program and the video and audio Presentation Time Stamps (PTS) have been perturbed by the process. When packets with a PCR are restamped, the new value is only based on the packet position within the newly created MPTS.

As an illustration of the impairments, one minute of one program was analyzed in the IP domain and at the QAM output. The distortion between the PCR and the PTS manifests itself in several ways. Specifically, the SPTS within a channel from some IP Edge QAMs do not meet the TS-TSD buffer requirements (FIG. 4). This can lead to video/audio artifacts in some MPEG decoders (for example, digital televisions, STBs, DTAs, etc.).

FIG. 5, shows the distribution of PCR Interval before processing by an IP Edge Modulator. The PCR accuracy of the SPTS on the IP network was measured at about ±100 msec. The target interval for PCRs is usually about 40 msec. It can be seen that the distribution is still centered on that average value, but there is substantial spread in the PCR interval.

FIG. 6, shows the distribution of PCR Interval after processing by the prior-art IP edge modulator described here. Although the PCR accuracy of this signal measured ±200 usec which is much closer to the MPEG2 compliant value of ±500 nsec, the PCR Interval is more distorted than the PCR in the IP domain. Here, the PCR interval ranged from 0.232 ms to 59.785 msec.

The jitter introduced on the IP network is mostly due to the bursty nature in which packets are processed and transmitted, especially if a general purpose processor is used to process and route packets. The bursty nature of the packet transmission can be seen by looking at UDP (User Datagram Protocol) packets on the IP network. As has been said, most of the UDP packets contain 7 MPEG2-TS packets. FIG. 7, is a graph of how many packets are received at the IP edge modulator in a 100 msec period. This graph approximately follows the actual bit rate of the SPTS in the original MPTS. However, if one looks at the number of packets sent in 10 msec interval, the traffic is much more bursty. See FIG. 8, Note that in one 10 msec interval 10 UDP packets may be received while in the next 10 msec interval, no packets may be received.

Table 1 shows a summary of some important parameters of this one minute live video capture. Note that the Transport Buffer Fullness is exceeded in many places and the Elementary Stream Buffer Fullness limit is exceeded for Dolby Audio for two out of the three programs.

TABLE 1

Buffer Statistics for 1 minute channel capture

| PID | Stream Type | Transport Drain Rate (kbps) | Transport Buffer Fullness (%) min | Transport Buffer Fullness (%) max | ES Buffer Size (bits) | ES Buffer Fullness (%) min | ES Buffer Fullness (%) avg | ES Buffer Fullness (%) max |
|---|---|---|---|---|---|---|---|---|
| 0x0000 | MPEG2 PSI PAT | 1,000 | 0.000 | 36.719 | | | | |
| 0x0010 | MPEG2 PSI PMT | 1,000 | 0.000 | 36.719 | | | | |
| 0x0011 | MPEG4 Video | 24,000 | 0.000 | 925.00 | 30,000,000 | 3.730 | 11.344 | 25.778 |
| 0x0012 | Dolby Digital Audio | 2,000 | 0.000 | 116.797 | 45,568 | 31.461 | 47.187 | 62.921 |
| 0x0020 | MPEG2 PSI PMT | 1,000 | 0.000 | 36.719 | | | | |
| 0x0021 | MPEG4 Video | 24,000 | 0.000 | 730.273 | 30,000,000 | 4.311 | 11.253 | 20.514 |
| 0x0022 | Dolby Digital Audio | 2,000 | 0.000 | 89.063 | 45,568 | 0.000 | 62.937 | 137.500 |
| 0x0023 | CA related | 1,000 | 0.000 | 36.719 | | | | |
| 0x0030 | MPEG2 PSI PMT | 1,000 | 0.000 | 36.719 | | | | |
| 0x0031 | MPEG4 Video | 24,000 | 0.000 | 717.188 | 30,000,000 | 6.497 | 12.001 | 21.236 |
| 0x0032 | Dolby Digital Audio | 2,000 | 0.000 | 63.086 | 45,568 | 0.000 | 63.221 | 269.663 |
| 0x0033 | CA Related | 1,000 | 0.000 | 36.719 | | | | |

A graph showing the Transport Buffer Fullness as a function of time for one of the video streams is shown in FIG. 9. Notice that the Transport Buffer Fullness is almost always above the limit. Transport Buffer Fullness of an audio stream is shown in FIG. 10. Although the Transport Buffer Fullness is mostly within the required limit, it was noted earlier that the ES Buffer Fullness limit is exceeded.

It is desirable to maintain low cost transport stream multiplexing while reducing, although perhaps not eliminating, re-multiplexing timing artifacts.

One method to minimize the TS-STD transport buffer overflows is to rate control the packets from each program entering the MPTS multiplex buffer. This can be done using a series of leaky buckets as shown in FIG. 11. The leaky buckets are placed between the previously described IP processing and the multiplex buffer. As packets "leak" from each bucket, they are placed in the multiplex buffer. The leaky buckets can be in an FPGA since the multiplex buffer can also be implemented in an FPGA. In this case, the multiplex buffer should be made large to minimize overflow, although flow control can easily be implemented.

In one embodiment, there is a leaky bucket for each program. The exit rate of the bucket should be set approximately to the drain rate used by the TS-STD in its transport buffers to determine compliance. Since an individual program's stream rate is dominated by the video, a reasonable approach would be to use the video transport buffer drain rate. The video transport drain rate can be derived from the bit_rate_value carried in the Video Sequence Header. If there is not enough processing power to parse the video stream down to the Video Sequence Header, then it is also possible to base the leak rate on the stream_type, which is carried in the Program Map Table (PMT) and/or the stream_id, which is carried in the PES Header. An even simpler approach would be to set the leak rate of all of the buckets to a constant that doesn't change. Good values would be 18 Mbps for SD video and 24 Mbps for HD video (see Table 2). In many cases, it is also possible to get information on the maximum bit rate, and therefore the transport buffer (TB) drain rate, through an out-of-band channel such as an Electronic Program Guide (EPG).

A more refined variation of this method would be to route each elementary stream through its own leaky bucket. This would be more precise and would reduce more artifacts, but it is a complexity/performance tradeoff. This is a straightforward extension of one leaky bucket per program and will not be explained further.

TABLE 2

Typical Video Transport Buffer Drain Rates

| Stream Type | Typical Max Bit Rate* | Associated Transport Buffer Drain Rate ($RX_{video}$) in Mbps |
|---|---|---|
| MPEG-2 Part 2 Video (Mail Level) | 15 | 18 |
| MPEG-2 Part 2 Video (High Level) | 19.4 | 23.28 |
| MPEG-4 Part 10 video (<Level 3.0) | 2 | 2.4 |
| MPEG-4 Part 10 video (<Level 3.0) | 10 | 12 |
| MPEG-4 Part 10 video (<Level 3.0) | 20 | 24 |

*Specified in bit_rate_value field of Video Sequence Header.

One embodiment of a method using the general aspects herein described is as follows:
1. Leaky Bucket on each SPTS being multiplexed into the MPTS with PCR Restamping/NULL padding set to on.
   a. Leak Rate set based on bit_rate_value.
   b. Leak rate set based on stream_type and/or stream_id.
   c. Leak Rate set to a constant
2. Or Leaky Bucket on each Elementary Stream.
   a. Leak Rate set based on bit_rate_value.
   b. Leak rate set based on stream_type and/or stream_id.
   c. Leak Rate set to a constant Another embodiment of a method to minimize the TS-STD transport buffer overflows is to control the number of consecutive packets from each program entering the MPTS multiplex buffer. This can be done by modifying the algorithm that releases packets to the multiplex buffer as shown in FIG. 13.

In this embodiment, the rules for transferring packets from each program into the multiplex buffer are modified to allow only a specific number of consecutive packets to enter. The rules would be as follows:
1. For remultiplexing of two streams:
   a. Alternate packets when both steams have packets available to transfer.
   b. When only one stream has packets available to transfer, transfer no more than M out of every N packets.

2. For remultiplexing of three or more streams
  a. Round-robin on packets from all steams that have packets available to transfer.
  b. When only one stream has packets available to transfer, transfer no more than M out of every N packets.

To determine N and M, we consider the transport buffers (TB) in the TS-STD (FIG. 4). Since an individual program's stream rate is dominated by the video, a reasonable approach would be to use the video transport buffer drain rate for all stream components (i.e., including audio). The drain rate of video transport buffer (TB) used in the TS-STD is determined by the video bitstream's maximum bitrate and is generally 1.2 times that maximum bitrate. The video transport drain rate can be found in the bit_rate_value carried in the Video Sequence Header. If there is not enough processing power to parse the video stream down to the Video Sequence Header, then it is also possible to base the drain rate on the stream_type, which is carried in the Program Map Table (PMT) and/or the stream_id, which is carried in the PES Header. An even simpler approach would be to use a drain rate that doesn't change. Good values would be 18 Mbps for SD video and 24 Mbps for HD video (see Table 2). In many cases, it is also possible to get information on the maximum bit rate and therefore the transport buffer drain rate through an out-of-band channel such as an Electronic Program Guide (EPG).

For the transport buffer level to at least remain constant and not overflow, the average bitrate of the incoming stream must be less than the average bitrate of the outgoing stream. So, $$M/N = TB_{outgoing\_rate}/TB_{incoming\_rate}.$$

This sets the ratio of M and N. To set an absolute value, note that TB=512 byte. Assume a drain rate of 24 Mbps. It should be kept in mind that the TB referred to here is the transport buffer in the TV decoder. In this example, the incoming transport buffer rate of the TV (i.e., QAM channel) is 38.8 Mbps, which is approximately one transport packet every 40 μsec. Assuming that the transport buffer starts out empty, the 512 byte transport buffer would overflow on the $6^{th}$ packet, which occurs at about 200 μsec. So, it would definitely be bad to have 6 or more transport stream packets in a row. So, in this case, M can be set to 5. N can now be calculated as N=5*(38.8/24)=8. In this example, up to 5 out of every 8 packets would be allowed to come from a specific stream with no more than 5 coming in a row.

In this embodiment, a method proceeds to limit the number of consecutive packets and frequency of packets from each SPTS with PCR Restamping/NULL padding set to on.

Another embodiment of a method to minimize the timing artifacts is to use the PCRs to "pace" the data from multiple streams during the remultiplexing process. The PCR in the transport stream header and the PTS's in the video stream are directly related as a result of the encoding process. In the encoding process, all video and audio streams included in a program must get their time stamps from a common System Time Clock (STC) so that synchronization of the video and audio decoders with each other can be accomplished. This is explained in the MPEG2 standards. The perturbation of this relationship by the IP network is what leads to the buffer overflow violations described earlier.

In the following, STC' is the Edge QAM's estimate of the STC associated with a given video/audio program. Δ' is the offset estimate between STC' and the Master Clock shown in FIG. 18. For the purposes of correlating the flowcharts in FIG. 17 with the clocks shown in FIG. 18, please note that Δ'(n)=T(n)−PCR(n).

In a streaming application, when the video/audio data is pulled off a storage media or a buffer, the access units must be output at a rate which will not cause overflow or underflow in the decoder buffer at the receiver. This is usually achieved by looking at the PTS/DTS values of the access units. The PTS/DTS fields appear in the PES header of the access unit and need parsing of the transport stream beyond transport header (FIG. 14).

Since the PTS/DTS values are related to the PCR as stated above and the PCR value is easily accessible in the transport header, the goal of managing the data rate of the streaming can be achieved by pacing the data using PCR values and parsing the transport header only FIG. 15). So, rather than rely on PCR restamping to eliminate PCR jitter, the PCR time stamps can be used to pace the data.

PCR time stamps are required to occur at maximum 100 mS intervals, but often occur at a faster rate, such as every 40 msec, for example. The PCR is based on a 27 MHz clock. In the original stream, which is assumed to be compliant, after a PCR is recorded, the next PCR will occur within the next 100 msec and its value will match the time that the packet arrives. Because of the jitter produced by the IP network, the packet may arrive early or late. To pace the data, the PCRs can be used to release packets to a downstream smoothing buffer after holding that packet and all following packets until the associated STC' matches the PCR.

FIG. 16 includes additions to the single QAM channel remultiplexing process to pace data based on the PCR time stamps. The NULL stuffing function is still required to fill out the full transport stream once several SPTS have been remultiplexed to form a new partial MPTS. The PCR restamping function is not needed since the PCRs should already be correct for their position in the transport stream, but it doesn't hurt to leave the PCR restamping function on. In most cases, the new PCR should match the old PCR.

In flowchart A of FIG. 17, the box that says "time_to_send=PCR−PCR(1)+T(1)" could be written as "time_to_send=PCR−Δ'(1)" Since Δ'(1) does not change, this offset is used for all subsequent packets and the relationship between the master clock and the estimate of the STC clock (STC') is a fixed offset. The first PCR packet sets the relationship between STC' and PCR. This is illustrated in FIG. 18.

This method can work well, but has the following disadvantage: If STC' is late because the $1^{st}$ PCR is late, then there is more delay between the IP receiver and remultiplexer than there needs to be. This wastes QAM buffer space. If the first PCR is early, then packets will be released as soon as they arrive and little improvement would be gained. Therefore, this scheme could benefit from some PCR to master clock adaptation as will be explained later.

In flowchart B of FIG. 17, the box that says "time_to_send=PCR(n)−PCR(n−1))+T(n−1)" could be written equivalently as "time_to_send=PCR(n)−Δ'(n−1)". In this case, Δ'(n)=T(n)−(PCR(n)) and the STC'/Master Clock relationship therefore is only based on the previous PCR sample.

This method can also improve the stream characteristics, but suffers from the following disadvantage. The continual reset of the STC' to Master Clock relationship has the problem that the relationship with the master clock causes slips to STC', causing the streaming buffer to grow in size.

A better approach to these two would be to have a somewhat stable Δ', but let it find its optimal value over time.

For this, a hybrid approach can be used, where the estimate of the offset Δ' adapts and is refined over time. This is shown for a single SPTS in flowchart C of FIG. 17. Instead of just using the first PCR to estimate a fixed Δ', one can use the current and past PCRs to update the estimate of delta. With Δ'(n)=T(n)−(PCR(n)) for each of the PCRs as in Flowchart B, a current estimate of the adaptive offset Δ" may be generally calculated as Δ"(n)=f({Δ'(i)|i=1 to n}). There are many functions "f" that can be used, but one approach bases Δ"(n) on the weighted sum of the current estimate Δ'(n) and the previous estimate of the adaptive offset Δ"(n−1): Δ"(n) =M/N*Δ"(n−1)+(N−M)/N*Δ'(n). This method has infinite memory. Alternatively, the estimate of Δ"(n) could be determined only by the last N estimates of Δ'(n). (e.g., Δ"(n)=sum of (½'*Δ'(i))*2N/(2N−1) where i ranges from n−N to n). Other variations are possible.

The remultiplexing process is further illustrated in FIG. 18 for the case of a fixed Δ' based on the arrival of the first PCR (i.e., flowchart A in FIG. 17). Note that once the PCR packets of both streams have passed the "time_to_send", packets can be alternated until packets are not available from either stream. If three or more SPTS's are being remultiplexed, then a round-robin approach can be used to load the multiplex buffer until no packets are available.

A general aspect of the embodiments described herein is control of a plurality of single program transport streams during a remultiplexing process.

One embodiment of such a system is shown in FIG. 19, which is a method 1900 for controlling a plurality of single program transport streams during remultiplexing. The method commences with start block 1901 and proceeds to block 1910 for buffering a single program transport stream (SPTS). Control then proceeds to block 1920 for calculating a transfer rate to be used in transferring a transport packet from the buffer used in step 1910 to a multiplex buffer. Control then proceeds to block 1930 for transferring a transport packet to a multiplex buffer at the calculated transfer rate.

Another embodiment of the general aspects described herein is an apparatus 2000 for controlling a plurality of single program transport streams during remultiplexing. The apparatus comprises a buffer 2010 of a single program transport stream which receives transport packets on its input. The output of buffer 2010 is in signal communication with a first input of processor 2020 and also with a first input of multiplex buffer 2030. Processor 2020 calculates a transfer rate to be used in transferring packets from buffer 2010 to multiplex buffer 2030 and generates an output control signal that is in signal communication with a second input of multiplex buffer 2030. Multiplex buffer 2030 stores transport packet data from buffer 2010.

Figure 21:
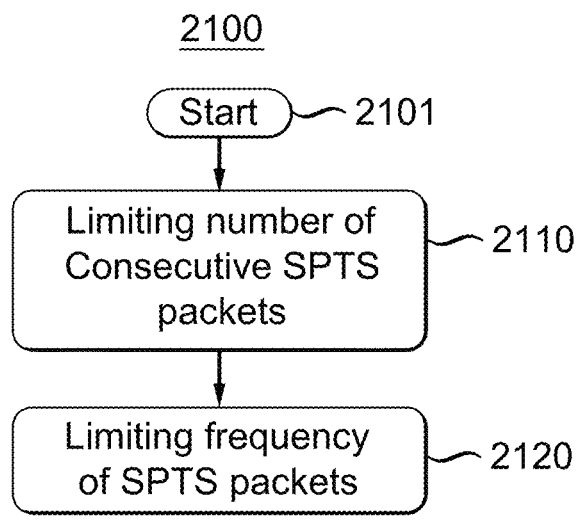
FIG. 21 shows a second embodiment of a method using the present principles.

Another embodiment of the principles described herein is a method 2100 shown in FIG. 21 for controlling a plurality of single program transport streams during remultiplexing. The method commences with start block 2101 and proceeds to block 2110 for limiting a number of consecutive single program transport streams coming from each of a plurality of streams. Control then proceeds to step 2120 for limiting a frequency of single program transport streams coming from each single program transport stream.

Figure 22:
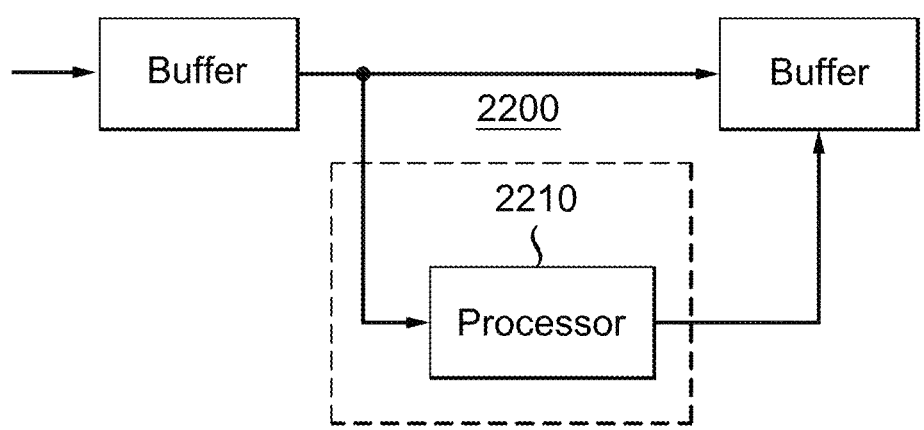
FIG. 22 shows a second embodiment of an apparatus using the present principles.

Still another embodiment of the principles described herein is an apparatus 2200 for controlling a plurality of single program transport streams during remultiplexing, shown in FIG. 22. The apparatus comprises a processor 2210 that is configured to limit a number of consecutive packets from each single program transport stream and further configured to limit a frequency of packets from each single program transport stream. Processor 2210 receives buffered transport packets on its input and controls the transfer of these packets to another buffer. Processor 2210 has an output in signal communication with the receiver buffer to control the transfer process.

Figure 23:
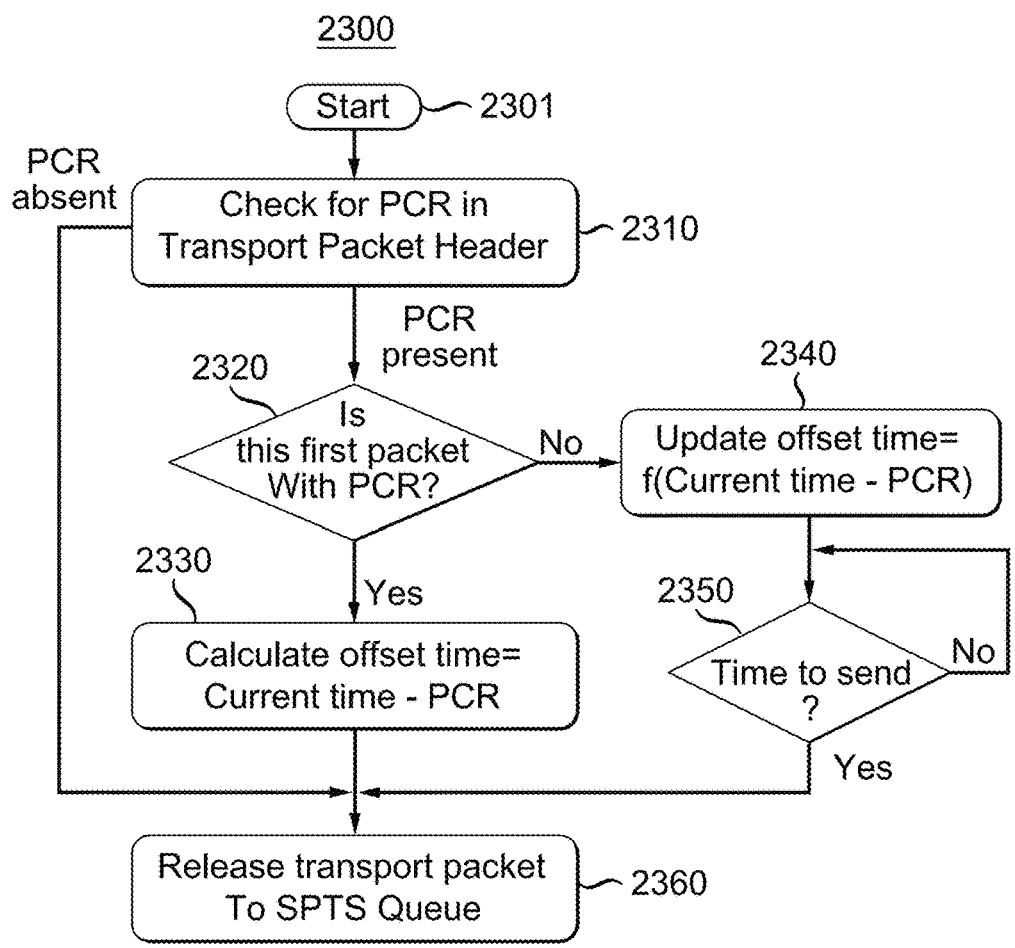
FIG. 23 shows a third embodiment of a method using the present principles.

Another embodiment of the general principles is a method 2300 for controlling a plurality of single program transport streams during remultiplexing, shown in FIG. 23. This implementation controls the remultiplexing process using multiple program clock reference values such that packets from each single program transport stream are released only after a previous program clock reference value is greater than the system time. The method commences at start block 2301 and proceeds to block 2310 for checking whether a program clock reference value is present within a transport packet header. If the program clock references is absent from the transport packet header, control proceeds from block 2310 to block 2360 for releasing a transport packet to the single program transport stream queue.

If, however, a program clock reference value is present within the transport packet header being checked in block 2310, control proceeds from block 2310 to block 2320 to determine whether this transport packet is the first to contain a program clock reference value. If it is, control proceeds from block 2320 to block 2330 for calculating an offset time that is equal to the difference between the current time and the program clock reference value. Control then proceeds from block 2330 to block 2360 for releasing a transport packet to the single program transport stream queue.

If, however, in block 2320 it is determined that the current transport packet is not the first packet containing a program clock reference value, control then proceeds from block 2320 to block 2340 for updating an offset time to be equal to a function of the difference between a current time and the program clock reference value. Control then proceeds from block 2340 to block 2350 to determine whether the current time has reached a time to send, based on the updated offset time. If the time to send has not yet been reached, block 2350 will recheck the time until the time to send is reached. When the time has reached the time to send, control proceeds from block 2350 to block 2360 for releasing a transport packet to the single program transport stream queue.

Figure 24:
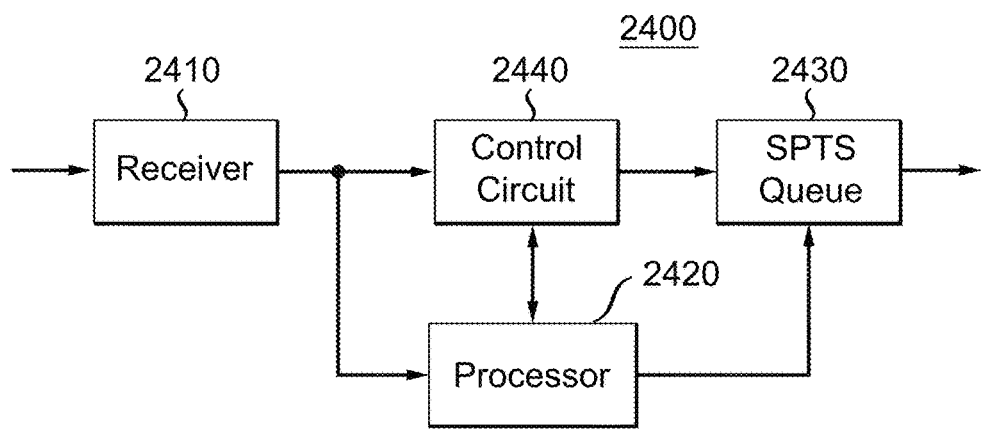
FIG. 24 shows a third embodiment of an apparatus using the present principles.

Another embodiment of the described principles is an apparatus 2400 for controlling a plurality of single program transport streams during remultiplexing, shown in FIG. 24. This apparatus controls the remultiplexing process using multiple program clock reference values such that packets from each single program transport stream are released only after a previous program clock reference value is greater than the system time.

The apparatus comprises a receiver 2410 of transport packets on its input, and whose output is in signal communication with an input of processor 2420 and also in signal communication with an input of control circuit 2440. Processor 2420 is configured to determine whether a program clock reference is present in the transport packet and whether the transport packet is the first packet to contain a PCR. Processor 2420 calculates at least one offset time to determine a time to transfer the transport packet to a single program transport stream queue. Processor 2420 is in signal communication with a port of control circuit 2440 and an output of processor 2420 is in signal communication with a first input of single program transport stream queue 2430. Control circuit 2440 has an output that is in signal communication with a second input of single program transport stream queue 2430 that receives the transport packet at the appropriate time. Control circuit 2440 retrieves the transport packet from receiver 2410 and transfers it to single program transport stream queue 2430 based on the current time, and at least one calculated offset time, which is calculated based on whether a program clock reference is contained in the transport header and whether it is the first transport packet to contain a PCR value.

The present description illustrates the present principles. It will thus be appreciated that those skilled in the art will be able to devise various arrangements that, although not explicitly described or shown herein, embody the present principles and are thereby included within the present principles.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications may be effected therein by one of ordinary skill in the pertinent art without departing from the scope of the present principles. All such changes and modifications are intended to be included within the scope of the present principles as set forth in the appended claims.

The invention claimed is:

1. A method for controlling a plurality of single program transport streams during remultiplexing, comprising:
buffering in a buffer of a plurality of single program transport streams;
determining, by a processor, a transfer data rate for each of the plurality of buffered single program transport streams, said transfer data rate being based on a drain data rate of a decoder transport buffer for the plurality of buffered single program transport streams;
transferring, by the processor, the plurality of buffered single program transport streams to a multiplex buffer associated with a multiple program transport stream at said determined transfer data rate for each of the plurality of buffered stream single program transport streams, said plurality of buffered single program transport streams being transferred to the multiplex buffer in alternating order;
buffering each of the plurality of single program transport streams;
restamping, by the processor, a program clock reference value; and
padding the plurality of single program transport streams with null packets.

2. The method of claim 1, further comprising buffering each elementary stream of the plurality of single program transport streams.

3. The method of claim 1, further comprising basing the transfer data rate on at least one of a bit_rate_value, a stream_type, a stream_id, or a constant value.

4. An apparatus for controlling a plurality of single program transport streams during remultiplexing, comprising:
at least one buffer that buffers a plurality of single program transport streams;
a processor that determines a transfer data rate from said at least one buffer for each of the plurality of buffered single program transport streams, said transfer data rate being based on a drain data rate of decoder transport buffer for plurality of buffered single program transport streams and transfers the plurality of buffered single program transport streams to a multiplex buffer associated with a multiple program transport stream at said determined transfer data rate for each of the plurality of buffered single program transport streams, said plurality of buffered single program transport streams being transferred to the multiplex buffer in alternating order;
a buffer of each of the plurality of single program transport streams;
the processor that restamps a program clock reference value; and
a buffer to pad the plurality of single program transport streams with null packets.

5. The apparatus of claim 4, further comprising: a buffer of each elementary stream of the plurality of single program transport streams.

6. The apparatus of claim 4 wherein said transfer data rate is based on at least one of a bit_rate_value, a stream_type, a stream_id, or a constant value.

* * * * *